United States Patent
Labonté

(10) Patent No.: US 11,134,015 B2
(45) Date of Patent: Sep. 28, 2021

(54) LOAD BALANCING THROUGH SELECTIVE MULTICAST REPLICATION OF DATA PACKETS

(71) Applicant: Arista Networks, Inc., Santa Clara, CA (US)

(72) Inventor: François Labonté, Menlo Park, CA (US)

(73) Assignee: Arista Networks, Inc., Santa Clara, CA (US)

( * ) Notice: Subject to any disclaimer, the term of this patent is extended or adjusted under 35 U.S.C. 154(b) by 111 days.

(21) Appl. No.: 16/514,605

(22) Filed: Jul. 17, 2019

(65) Prior Publication Data

US 2021/0021522 A1    Jan. 21, 2021

(51) Int. Cl.
*H04W 56/00* (2009.01)
*H04L 12/803* (2013.01)
*H04L 12/24* (2006.01)
*H04L 12/801* (2013.01)

(52) U.S. Cl.
CPC ............ *H04L 47/125* (2013.01); *H04L 41/12* (2013.01); *H04L 47/17* (2013.01); *H04L 47/19* (2013.01)

(58) Field of Classification Search
CPC ......... H04L 7/125; H04L 41/12; H04L 47/17; H04L 47/19

USPC ......................................................... 370/235
See application file for complete search history.

(56) References Cited

U.S. PATENT DOCUMENTS

| | | | |
|---|---|---|---|
| 8,937,865 B1 * | 1/2015 | Kumar | H04L 47/76 370/235 |
| 10,237,206 B1 * | 3/2019 | Agrawal | H04L 45/28 |
| 2005/0022017 A1 * | 1/2005 | Maufer | G06F 16/22 726/4 |
| 2018/0034737 A1 * | 2/2018 | Wackerly | H04L 45/306 |
| 2019/0296922 A1 * | 9/2019 | Dutta | H04L 12/1886 |

* cited by examiner

*Primary Examiner* — Sai Ming Chan
(74) *Attorney, Agent, or Firm* — Chamberlain, Hrdlicka, White, Williams & Aughtry

(57) ABSTRACT

Load balancing through selective multicast replication of data packets in a computer network. Specifically, selective multicast replication entails facilitating the graceful removal or hitless addition of one or more load balancing nodes in a load balancing cluster by multicasting, rather than encapsulating, received data packets from any given client to the load balancing cluster. Further, selective multicast replication considers whether received data packets are synchronize (SYN) or non-synchronize (non-SYN) data packets, in order to employ an appropriate forwarding group towards forwarding the received data packets to one or more appropriate load balancing nodes in the load balancing cluster.

20 Claims, 27 Drawing Sheets

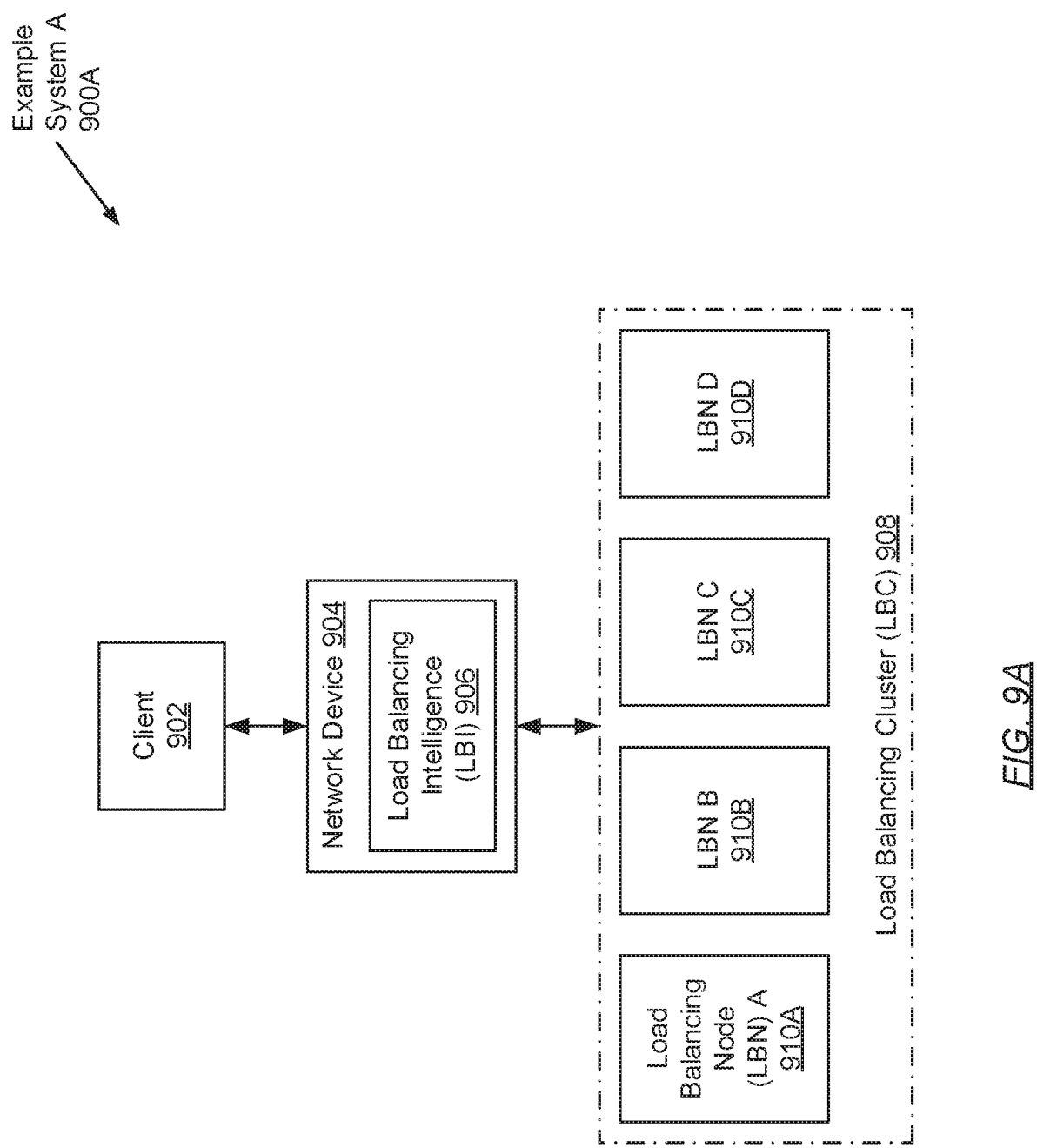

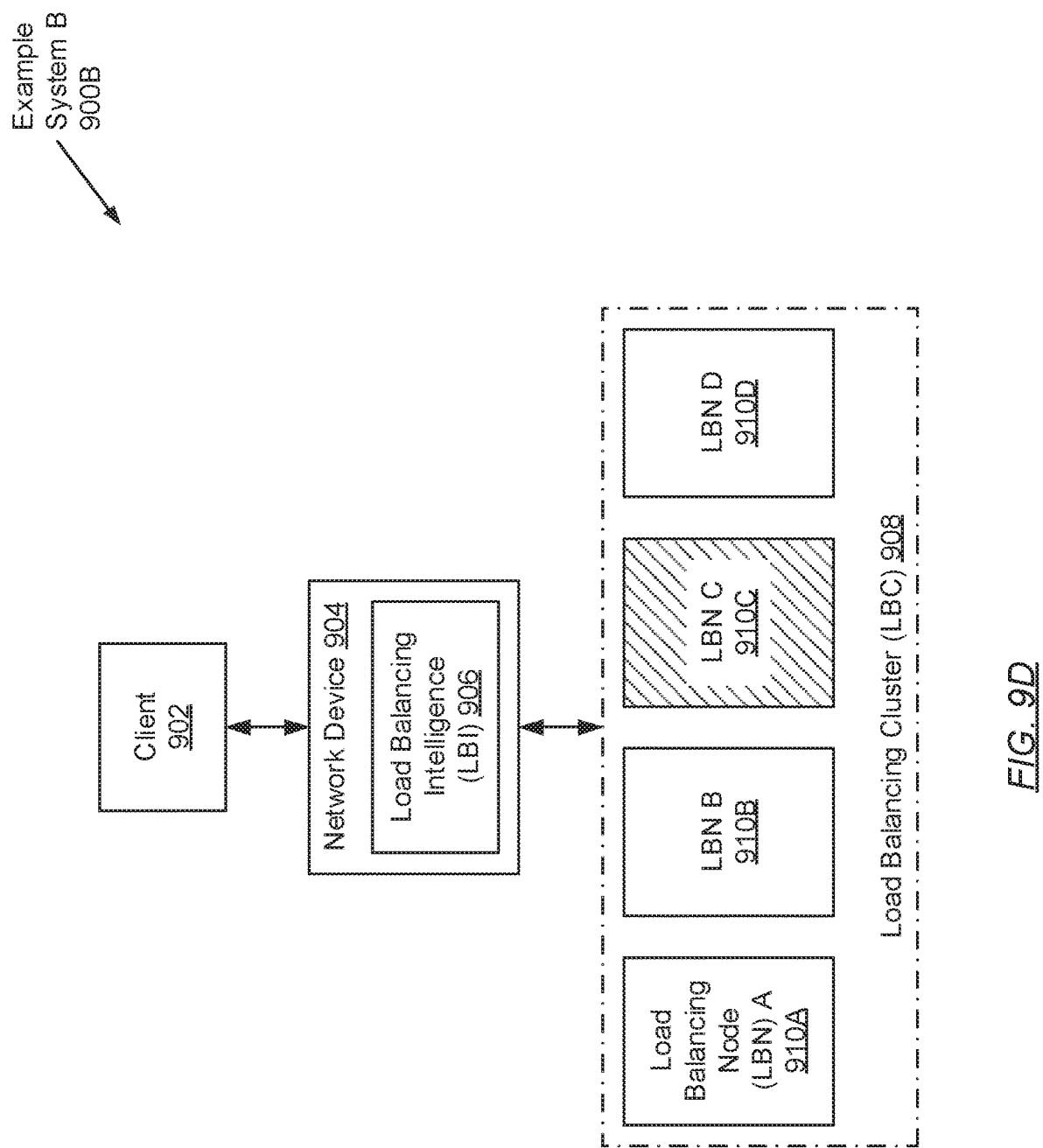

LOAD BALANCING THROUGH SELECTIVE MULTICAST REPLICATION OF DATA PACKETS

BACKGROUND

Load balancing clusters service numerous clients through a variety of load balancing management algorithms. One such algorithm maps selective header information from data packets, which uniquely identify given client sessions, to the same node in a load balancing cluster. However, reliably mapping to the same node becomes more difficult when the load balancing cluster changes due to failovers, scaling up or down requirements, and/or denial of service attacks.

SUMMARY

In general, in one aspect, the invention relates to a method for forwarding data packets. The method includes receiving, from a client, a first data packet including first header information, generating a first hash key using at least a portion of the first header information and a hashing function, obtaining a first hash bucket using the first hash key and a mapping function, making a first determination that a multicast replication status (MRS) is enabled, based on the first determination, making a second determination that the first data packet is a non-synchronize (non-SYN) data packet, identifying, based on the second determination, a first group lookup table (GLT) entry associated with a tertiary forwarding group, retrieving a first group base index (GBI) from the first GLT entry, deriving a first next-hop table index (NTI) using the first GBI and the first hash bucket, performing a first lookup on a next-hop table (NHT) using the first NTI, to obtain a first node forwarding information (NFI) and a second NFI, and multicasting the first data packet to a first load balancing node (LBN) using the first NFI and a second LBN using the second NFI.

In general, in one aspect, the invention relates to a system. The system includes a client, a load balancing cluster (LBC) operatively connected to the client, and including a plurality of load balancing nodes (LBNs), and a computer processor operatively connected to the client and the LBC, and whereon a load balancing intelligence (LBI) is executing, wherein the LBI is programmed to receive, from the client, a data packet including header information, generate a hash key using at least a portion of the header information and a hashing function, obtain a hash bucket using the hash key and a mapping function, make a first determination that a multicast replication status (MRS) is enabled, based on the first determination make a second determination that the data packet is a non-synchronize (non-SYN) data packet, identify, based on the second determination, a group lookup table (GLT) entry associated with a tertiary forwarding group, retrieve a group base index (GBI) from the GLT entry, derive a next-hop table index (NTI) using the GBI and the hash bucket, perform a lookup on a next-hop table (NHT) using the NTI, to obtain a first node forwarding information (NFI) and a second NFI, and multicast the data packet to a first LBN of the plurality of LBNs using the first NFI and a second LBN of the plurality of LBNs using the second NFI.

In general, in one aspect, the invention relates to a non-transitory computer readable medium (CRM). The non-transitory CRM includes computer readable program code, which when executed by a computer processor, enables the computer processor to receive, from a client, a data packet including header information, generate a hash key using at least a portion of the header information and a hashing function, obtain a hash bucket using the hash key and a mapping function, make a first determination that a multicast replication status (MRS) is enabled, based on the first determination make a second determination that the data packet is a non-synchronize (non-SYN) data packet, identify, based on the second determination, a group lookup table (GLT) entry associated with a tertiary forwarding group, retrieve a group base index (GBI) from the GLT entry, derive a next-hop table index (NTI) using the GBI and the hash bucket, perform a lookup on a next-hop table (NHT) using the NTI, to obtain a first node forwarding information (NFI) and a second NFI, and multicast the data packet to a first load balancing node (LBN) using the first NFI and a second LBN using the second NFI.

Other aspects of the invention will be apparent from the following description and the appended claims.

DETAILED DESCRIPTION

Figure 1A:
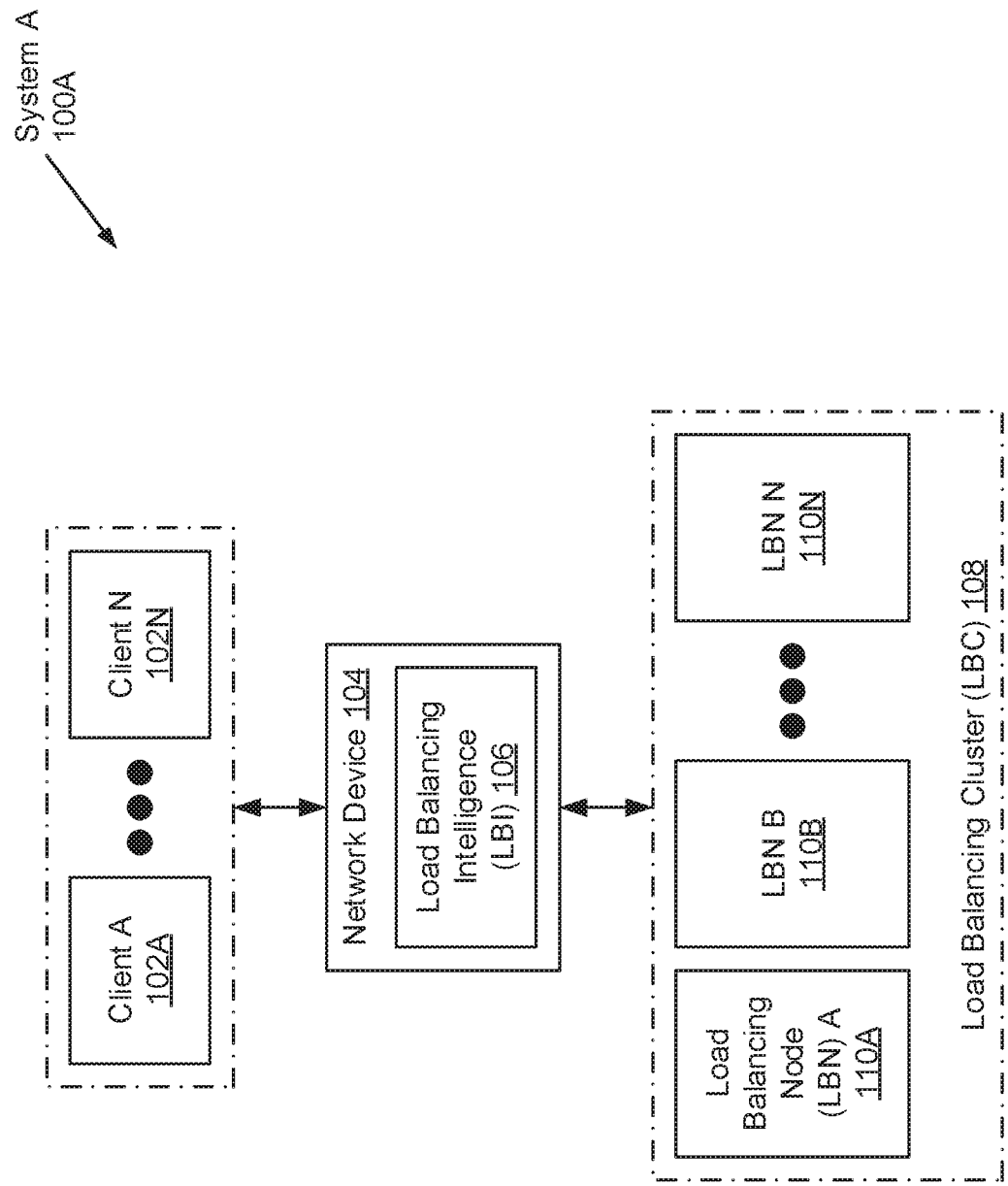
FIG. 1A shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-9O, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to load balancing through selective multicast replication of data packets in a computer network. Specifically, one or more embodiments of the invention entails facilitating the graceful removal or hitless addition of one or more load balancing nodes in a load balancing cluster by multicasting, rather than encapsulating, received data packets from any given client to the load balancing cluster. Further, selective multicast replication considers whether received data packets are synchronize (SYN) or non-synchronize (non-SYN) data packets, in order to employ an appropriate forwarding group towards forwarding the received data packets to one or more appropriate load balancing nodes in the load balancing cluster.

Modern load balancing in data centers, which facilitates the graceful removal or hitless addition of a load balancing node, employs a stateless table method where data packets are encapsulated in header information that encodes an Internet Protocol (IP) address for the removed or added load balancing node. This approach, however, requires modifications in the IP stack of the load balancing node, which may encompass stripping a tunnel header, performing a lookup on an IP connection table, and upon identifying a miss, redirecting a data packet to an old (e.g., absent or existing) load balancing node. In contrast to data packet encapsulation, embodiments of the invention maintain load balancing through selective multicast replication, which avoids any changes to the IP stack of the load balancing node. The eluding of the aforementioned changes to the IP stack may be accomplished through the re-configuration of modern operating systems (OSs) to just drop data packets that are not tracked in the IP connection table.

In one embodiment of the invention, the graceful removal of a load balancing node may refer to the ejection of the load balancing node from a datacenter (or cluster) with zero or minimal disruption to datacenter (or cluster) services and/or traffic. Subsequently, the graceful or non-disruptive removal of the load balancing node may entail isolating the load balancing node from any active traffic forwarding paths in the datacenter (or cluster). Isolation of the load balancing node may be achieved by, for example, manipulating the routing metrics associated with the load balancing node and used by traffic forwarding decision-makers (e.g., network devices, load balancing managers, etc.), such that the load balancing node is viewed as the least favorable candidate in traffic routing calculations, which may lead to the re-routing of traffic to alternative load balancing nodes.

In one embodiment of the invention, the hitless addition of a load balancing node may refer to the insertion of the load balancing node into a datacenter (or cluster) with zero or minimal disruption to datacenter (or cluster) services and/or traffic. Subsequently, the hitless or non-disruptive addition of the load balancing node may entail introducing the load balancing node to any active traffic forwarding paths in the datacenter (or cluster). Introduction of the load balancing node may be achieved by, for example, advertising the load balancing node in the routing and/or forwarding tables of traffic forwarding decision-makers (e.g., network devices, load balancing managers, etc.), such that the load balancing node is considered in their traffic forwarding decisions.

FIG. 1A shows a system in accordance with one or more embodiments of the invention. The system (100A) may include one or more clients (102A-102N), a network device (104), and a load balancing cluster (LBC) (108). Each of these components is described below.

In one embodiment of the invention, the aforementioned system (100A) components may be directly or indirectly connected to one another through a network (not shown) (e.g., a local area network (LAN), a wide area network (WAN) such as the Internet, a mobile network, etc.). The network may be implemented using any combination of wired and/or wireless connections. In embodiments in which the aforementioned system (100A) components are indirectly connected, there may be other network components or systems (e.g., switches, routers, gateways, etc.) that facilitate communications, information exchange, and/or resource sharing. Further, the aforementioned system (100A) components may communicate with one another using any combination of wired and/or wireless communication protocols.

In one embodiment of the invention, each client (102A-102N) may represent any physical computing system that may include functionality to generate, send, and receive data packets (e.g., media access control (MAC) frames). Each client (102A-102N) may include at least one computer processor, memory, and two or more physical network interfaces. Further, each client (102A-102N) may include functionality to: transmit data packets to the LBC (108) using a virtual Internet Protocol (IP) address; and, subsequently, receive data packets from the LBC (108) following their processing. One of ordinary skill will appreciate that each client (102A-102N) may perform other functionalities without departing from the scope of the invention. Examples of each client (102A-102N) may include, but are not limited to, a desktop computer, a laptop computer, a tablet computer, a server, a mainframe, a smartphone, or any other computing system similar to the exemplary computing system shown in FIG. 8.

In one embodiment of the invention, the network device (104) may be a physical device that includes persistent storage, memory (e.g., random access memory (RAM), shared memory, etc.), one or more computer processors (including a switch chip or network processor), and two or more physical network interfaces. The computer processor(s) may be programmed to determine out of which physical network interface on the network device (104) to forward data packets. To that end, the computer processor(s)

may include logical egress and ingress network interfaces that may connect to physical network interfaces on the network device (104). Furthermore, the network device (104) may include functionality to receive data packets via one or more physical network interfaces, and determine whether to: drop the data packets; process the data packets based on the configuration of the network device (104); and/or send data packets, based or following their processing, out one or more other physical network interfaces towards one or more destinations. By way of examples, the network device (104) may represent a switch, a router, or a multilayer switch. Further, the network device (104) is not limited to the aforementioned specific examples.

In one embodiment of the invention, how the network device (104) makes a determination of whether to drop data packets and/or send data packets to other system (100A) components, at least in part, depends on whether the network device (104) is a layer-2 (L2) switch or a layer-3 (L3) switch (also referred to as a multilayer switch), which may perform at least some functions of a router. In one embodiment of the invention, if the network device (104) is operating as a L2 switch, the network device (104) may use the destination MAC address along with a forwarding table or policy to determine out of which physical network interface to send data packets. Alternatively, in another embodiment of the invention, if the network device (104) is operating as a L3 switch, the network device (104) may use the destination IP address along with a routing table or policy to determine out of which physical network interface to send data packets, and may include the ability to write the MAC address of the next hop (or component) to receive the data packets in place of its own MAC address (which the last hop or component to send the data packets wrote) in the L2 information encapsulating the data packets. Moreover, in yet another embodiment of the invention, if the network device (104) is operating as a multilayer switch, the network device (104) may include functionality to process data packets using both MAC and IP addresses.

In one embodiment of the invention, the network device (104) may host a load balancing intelligence (LBI) (106). The LBI (106) may be a computer program or process (i.e., an instance of a computer program) that executes on the underlying hardware of the network device (104). More specifically, the LBI (106) may be a computer program or process tasked with load balancing the distribution of data packets through selective multicast replication in accordance with one or more embodiments of the invention. To that extent, the LBI (106) may include functionality to: maintain forwarding data structures (e.g., equal cost multipath (ECMP) tables) based on updates to the LBC (108) (see e.g., FIGS. 3A-4B); track various information (described below) pertinent to multicast replication and terminate said process based on the tracked information (see e.g., FIG. 5); and forward data packets from a given client (102A-102N) to one or more appropriate load balancing nodes (LBNs) (110A-110N) of the LBC (108) based on the aforementioned maintained forwarding data structures (see e.g., FIGS. 6A and 6B). One of ordinary skill will appreciate that the LBI (106) may perform other functionalities without departing from the scope of the invention.

In one embodiment of the invention, the LBC (108) may refer to a group of linked nodes—i.e., LBNs (110A-110N) (described below)—that, separately or in combination, implement one or more applications and/or services. The LBC (108) may be associated with a virtual IP address, which may map to the various LBNs (110A-110N) and may be used by the one or more clients (102A-102N) to direct data packets thereto for processing.

Figure 8:
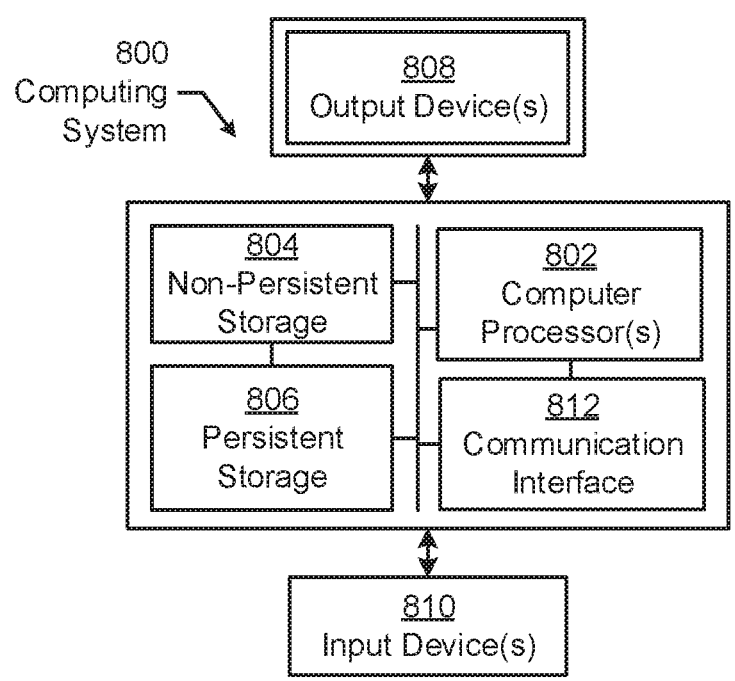
FIG. 8 shows a computing system in accordance with one or more embodiments of the invention.

In one embodiment of the invention, each LBN (110A-110N) may represent an appliance—e.g., a server, which may be a physical server that may reside in a datacenter or a virtual server that may reside in a cloud computing environment; or any computing system similar to the exemplary computing system shown in FIG. 8. Each LBN (110A-110N) may include functionality to generate, send, receive, and/or process requests and replies, either locally or over a network (not shown). Accordingly, each LBN (110A-110N) may include functionality to generate, receive, and/or transmit data packets (e.g., MAC frames). Examples of each LBN (110A-110N) may include, but are not limited to, a database server, a dynamic host configuration protocol (DHCP) server, an application server, a file server, a print server, a mail server, or any other server that provides one or more applications and/or services to the one or more clients (102A-102N).

In one embodiment of the invention, each LBN (110A-110N) may maintain state associated with client sessions involving one or more clients (102A-102N). A client session may refer to an information interchange between the LBN (110A-110N) and a client (102A-102N), which may involve the communication of various data packets in each direction. Also, in one embodiment of the invention, each LBN (110A-110N) may not share client session state with the remaining LBNs (110A-110N) of the LBC (108). Further, client sessions may take form, for example, as hypertext transfer protocol (HTTP) sessions, telnet remote login sessions, session initiation protocol (SIP) sessions, and transmission control protocol (TCP) sessions. In receiving data packets for a client session for which a LBN (110A-110N) does not maintain state, the LBN (110A-110N) may conventionally respond by transmitting reset (RST) packets back to the client (102A-102N). However, in implementing load balancing through selective multicast replication in accordance with embodiments of the invention, each LBN (110A-110N) may be configured to alternatively respond by dropping data packets for client sessions for which the LBN (110A-110N) does not maintain state and, subsequently, refrain from transmitting the aforementioned RST packets.

While FIG. 1A shows a configuration of components, other system configurations may be used without departing from the scope of the invention. For example, refer to FIG. 1B described below.

Figure 1B:
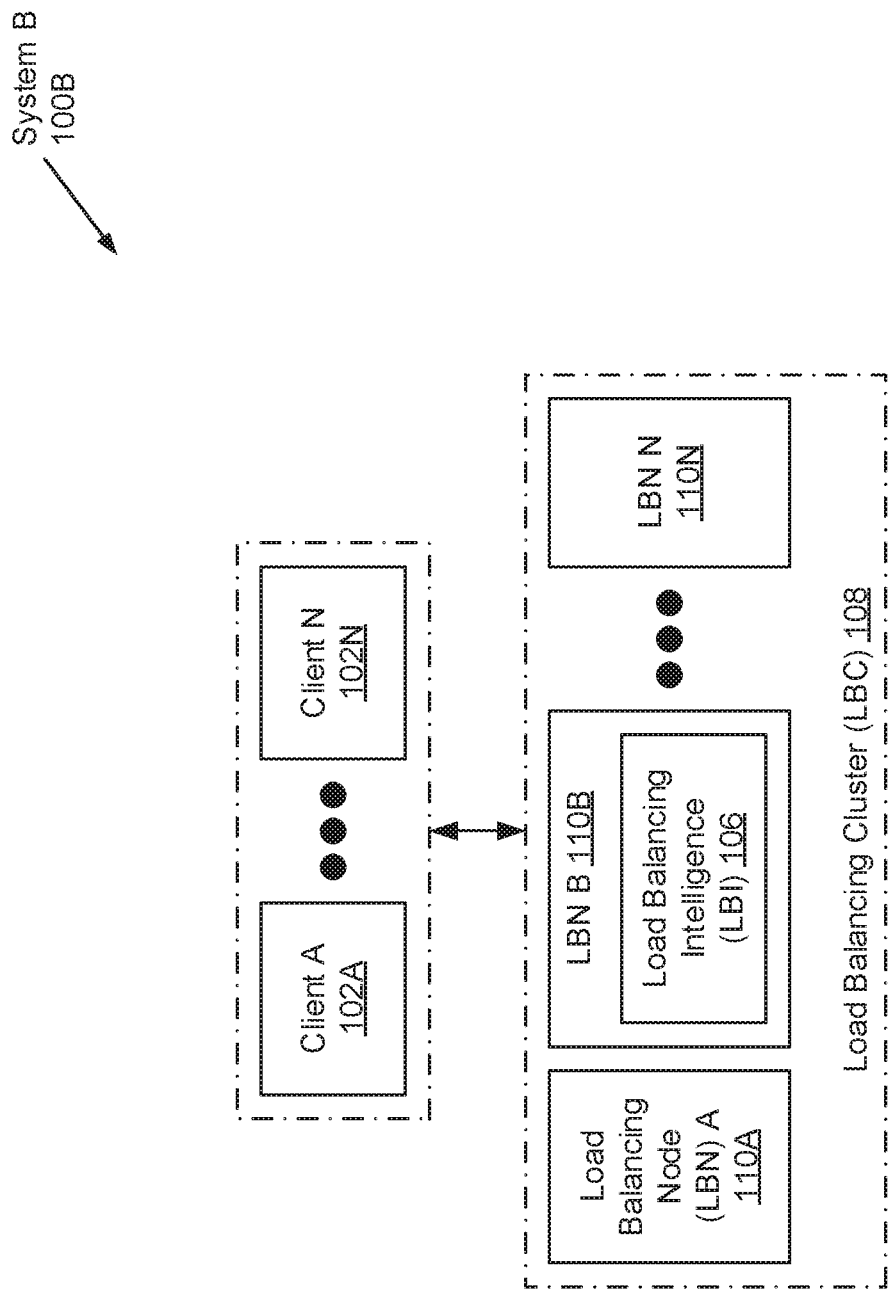
FIG. 1B shows a system in accordance with one or more embodiments of the invention.

FIG. 1B shows a system in accordance with one or more embodiments of the invention. The system (100B) may include one or more clients (102A-102N) operatively connected to a load balancing cluster (LBC) (108). In contrast to the system (100A) depicted in FIG. 1A, this alternative system (100B) omits the disposition of a network device (104) between the clients (102A-102N) and the LBC (108). Accordingly, in this alternative system (100B), the load balancing intelligence (LBI) (106) (described above) may alternatively be hosted by at least one of the load balancing nodes (LBN) (110A-110N) forming the LBC (108).

Figure 2A:
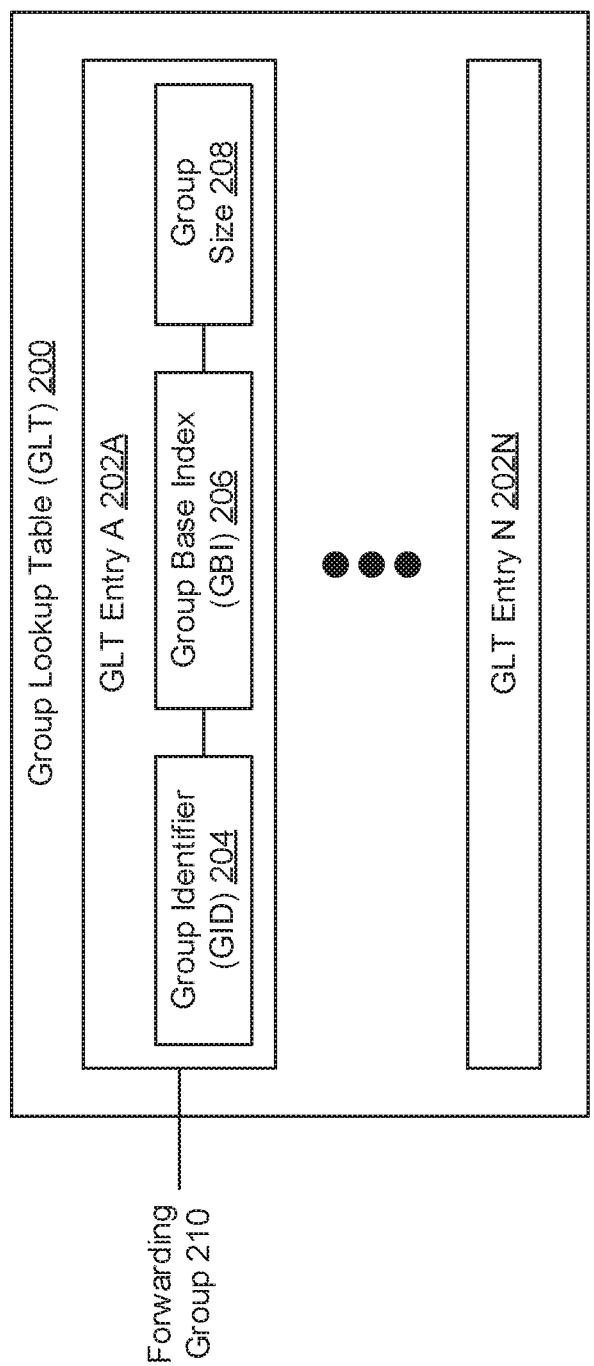
FIG. 2A shows a group lookup table in accordance with one or more embodiments of the invention.

FIG. 2A shows a group lookup table (GLT) in accordance with one or more embodiments of the invention. The GLT (200) may represent an associative mapping data structure that stores referencing information pertinent to one or more forwarding groups (210) (described below). Further, the GLT (200) may include one or more GLT entries (202A-202N), where each GLT entry (202A-202N) may be associated with a given forwarding group (210); and may map a group identifier (GID) (204) to a group base index (GBI) (206) and a group size (208). Each of these objects is described below.

In one embodiment of the invention, a forwarding group (210) may refer to a list of unique next-hops that may be referenced by multiple routes. Forwarding groups (210) may also be referred to as equal cost multipath (ECMP) groups. By way of examples, the forwarding group (210), associated with a given GLT entry (202A-202N), may include, but are not limited to: (a) a primary (e.g., "normal") forwarding group; (b) a secondary (e.g., "SYN") forwarding group; and (c) a tertiary (e.g., "non-SYN") forwarding group. The primary forwarding group may be employed to forward any and all data packets under normal operating conditions. Normal operating conditions may include any given time excluding (or outside) the spans of time during which the graceful removal of one or more existing load balancing nodes (LBNs) (see e.g., FIGS. 1A and 1B) from the load balancing cluster (LBC), or the hitless addition of one or more new LBNs to the LBC, may be transpiring. The secondary forwarding group may be alternatively employed to forward synchronize (SYN) data packets under abnormal operating conditions. Abnormal operating conditions include, but are not limited to, the graceful removal of one or more existing LBNs from the LBC, and/or the hitless addition of one or more new LBNs to the LBC. Further, a SYN data packet may refer to a first data packet transmitted in any client session interchange (described above), which may be sent by a client to indicate that a new connection, yet to be established, is sought. Moreover, the tertiary forwarding group may be employed to forward non-SYN data packets under any of the above-mentioned abnormal operating conditions. A non-SYN data packet may refer to any given data packet transmitted subsequent to the first (or SYN) data packet (described above) in any given client session interchange.

In one embodiment of the invention, the GID (204) may refer to an arbitrary-length character string that may uniquely identify (or name) a given forwarding group (210) with which a GLT entry (202A-202N) may be associated. The GBI (206), on the other hand, may refer to a numerical value (e.g., a natural number including zero) or an address (e.g., a memory address) that references a lead next-hop table (NHT) entry (see e.g., FIG. 2B or FIG. 2C) of a NHT entry set. The NHT entry set may refer to a set of one or more successively (or adjacently) positioned NHT entries in the NHT, which collectively store the forwarding information pertinent to the list of unique next-hops representative of the given forwarding group (210) with which the GLT entry (202A-202N) may be associated. The lead NHT entry (also referred to as the base NHT entry), for a given NHT entry set, may refer to the first (or topmost) positioned NHT entry of the given NHT entry set. Lastly, the group size (208) may refer to a numerical value (e.g., a positive integer) that may indicate a cardinality (or quantity) of the NHT entry set mapped to the given forwarding group (210) with which the GLT entry (202A-202N) may be associated.

Figure 2B:
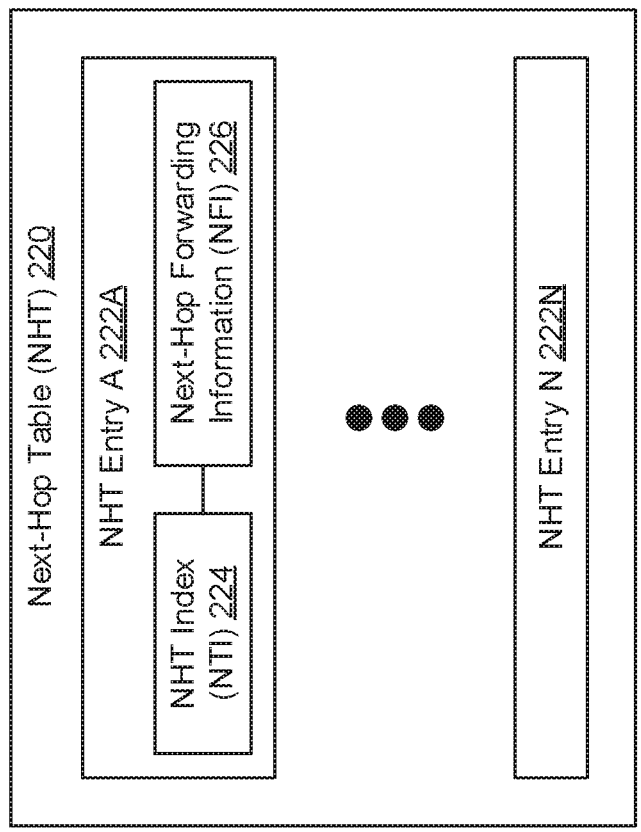
FIG. 2B shows a next-hop table in accordance with one or more embodiments of the invention.

FIG. 2B shows a next-hop table (NHT) in accordance with one or more embodiments of the invention. The NHT (220) may represent an associative mapping data structure that stores forwarding information pertinent to one or more load balancing nodes (LBNs) (see e.g., FIGS. 1A and 1B) forming a load balancing cluster (LBC). Further, the NHT (220) may include one or more NHT entries (222A-222N), where each NHT entry (222A-222N) may map a next-hop table index (NTI) (224) to next-hop forwarding information (NFI) (226). Each of these objects is described below.

In one embodiment of the invention, the NTI (224) may refer to a numerical value (e.g., a natural number including zero) or an address (e.g., a memory address) that references the NHT entry (222A-222N) within which the NTI (224) resides. Accordingly, the NTI (224) may reflect the position of the NHT entry (222A-222N) in the NHT (220).

In one embodiment of the invention, NFI (226) may collectively encompass one or more pieces of information that may be necessary to forward data packets to a given LBN. Accordingly, NFI (226) may include, for example, the media access control (MAC) address associated with the given LBN and a network interface of the host (e.g., a network device or a LBN) of the load balancing intelligence (LBI) (described above) that connects to the given LBN. NFI (226) may further include the Internet Protocol (IP) address associated with the given LBN. One of ordinary skill will appreciate that NFI (226) may include additional or alternative information, which may be used to forward data packets to a given LBN, without departing from the scope of the invention.

Furthermore, in one embodiment of the invention, should a given NHT entry (222A-222N) map to a primary (e.g., "normal") or secondary (e.g., "SYN") forwarding group (described above) (see e.g., FIG. 2A), the NFI (226) disclosed therein may pertain to a single LBN. With NFI (226) directed to a single LBN, either of the aforementioned forwarding groups may facilitate unicast (or single destination) packet forwarding. Alternatively, should a given NHT entry (222A-222N) map to a tertiary (e.g., "non-SYN") forwarding group (described above) (see e.g., FIG. 2A), the NFI (226) disclosed therein may pertain to a single LBN or multiple LBNs. Accordingly, with NFI (226) directed to a single LBN or multiple LBNs, the tertiary forwarding group may facilitate unicast or multicast (i.e., simultaneous multiple destinations) packet forwarding, respectively.

Figure 2C:
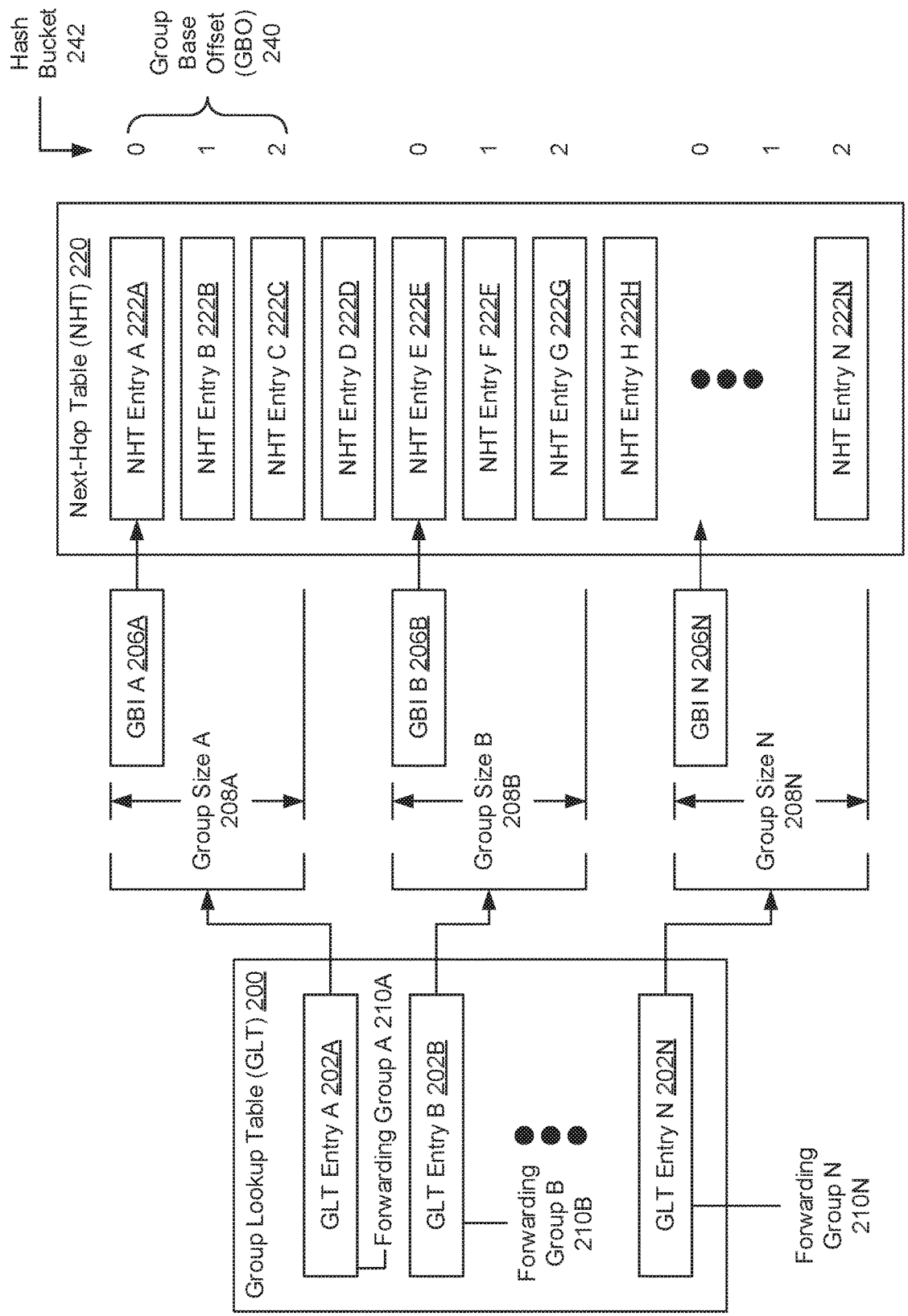
FIG. 2C shows a mapping connecting a group lookup table and a next-hop table in accordance with one or more embodiments of the invention.

FIG. 2C shows a mapping connecting a group lookup table (GLT) and a next-hop table (NHT) in accordance with one or more embodiments of the invention. The GLT (200), as described in FIG. 2A, may represent an associative mapping data structure that stores referencing information pertinent to one or more forwarding groups (210A-210N) and, respectively, includes one or more GLT entries (202A-202N). Further, each GLT entry (202A-202N) may specify at least a group base index (GBI) (206A-206N) and a group size (208A-208N). Meanwhile, the NHT (220), as described in FIG. 2B, may represent an associative mapping data structure that stores forwarding information pertinent to one or more next-hops and, respectively, includes one or more NHT entries (222A-222N).

In one embodiment of the invention, one or more successively (or adjacently) positioned NHT entries (222A-222N) may be logically grouped to form a NHT entry set (not shown). Each NHT entry set is mutually exclusive from any other NHT entry set. That is, the one or more NHT entry sets do not share, or include overlapping, NHT entries (222A-222N). Further, a given NHT entry set may be defined by a GBI (206A-206N) and a group size (208A-208N) at least specified in a given GLT entry (202A-202N). Accordingly, a given NHT entry set may map to a given forwarding group (210A-210N) associated with the given GLT entry (202A-202N). Specifically, with respect to a given NHT entry set: (a) the GBI (206A-206N) may reference a lead NHT entry (also referred to as the base NHT entry), for the given NHT entry set, which refers to the first (or topmost) positioned NHT entry of the given NHT entry set; and (b) the group size (208A-208N) (also referred to as the cardinality of the given NHT entry set) may indicate a quantity of NHT entries (222A-222N) forming the given NHT entry set.

In one embodiment of the invention, hash buckets (242) (described below) may be employed, in conjunction with a GBI (206A-206N) for a given NHT entry set, to identify specific NHT entries (222A-222N) that form the given NHT entry set. That is, a hash bucket (242) (also referred to as a group base offset (GBO) (240)) may serve to reflect a relative distance (i.e., in terms of a number of NHT entries (222A-222N)) between the position of a specific NHT entry (222A-222N), of a given NHT entry set, and the lead NHT entry for the given NHT entry set, which is referenced by the GBI (206A-206N). Accordingly, a hash bucket (242) may be expressed as a numerical value (e.g., a natural number including zero). When the hash bucket (242) reflects a zero numerical value, the specific NHT entry (222A-222N) of the given NHT entry set, which is identified by the GBI (206A-206N) for the given NHT entry set and the hash bucket (242), may be the lead NHT entry (which is positioned zero NHT entries away from itself—the lead NHT entry for the given NHT entry set). Based on the same logic, when the hash bucket (242) reflects any other positive integer numerical value (e.g., one, two, three, etc.), the specific NHT entry (222A-222N) of the given NHT entry set, may be any other NHT entry (222A-222N) (excluding the lead NHT entry), respectively, of the given NHT entry set (which may be positioned the positive integer numerical value (e.g., one, two, three, etc.) of NHT entries away from the lead NHT entry).

In one embodiment of the invention, a hash bucket (242) may represent an index that may result from the processing of a given hash key (described below) using a mapping function. A mapping function may refer to an algorithm that maps hash keys to predetermined indices representative of one or more hash buckets (242). Ideally, a mapping function maps a given hash key to a unique index (e.g., hash bucket (242)), thereby preventing collisions (i.e., when a same index may be mapped to more than one hash key). By way of an example, a modulo mapping function may be employed as the mapping function, which often entails reduction of any given hash value to an index (e.g., an integer between zero and one less than a specified modulus, which often is selected as the cardinality (or group size) of a given NHT entry set) using the modulo operator (%).

In one embodiment of the invention, a hash key may refer to a fixed-length, deterministic character string that may be generated using at least a portion of header information, embedded in a given data packet, and a hashing function. A hashing function may refer to an algorithm that translates arbitrary-length data (also referred to as hashing function inputs) to hash keys. Further, any given hashing function input may encompass a data item or, alternatively, a combination of two or more data items that, at least in part, constitute the aforementioned header information of a given data packet. By way of examples, any given hashing function input may include, but is not limited to, any combination or all of the following header information data items: a destination media access control (MAC) address, a source MAC address, a destination Internet Protocol (IP) address, a source IP address, a virtual local area network (VLAN) tag, length information, protocol information, etc. Further, examples of the hashing function may include, but is not limited to, the Secure Hash Algorithm (SHA) family of hashing functions, the Message-Digest (MD) family of hashing functions, the Pearson hashing function, etc.

Figure 3:
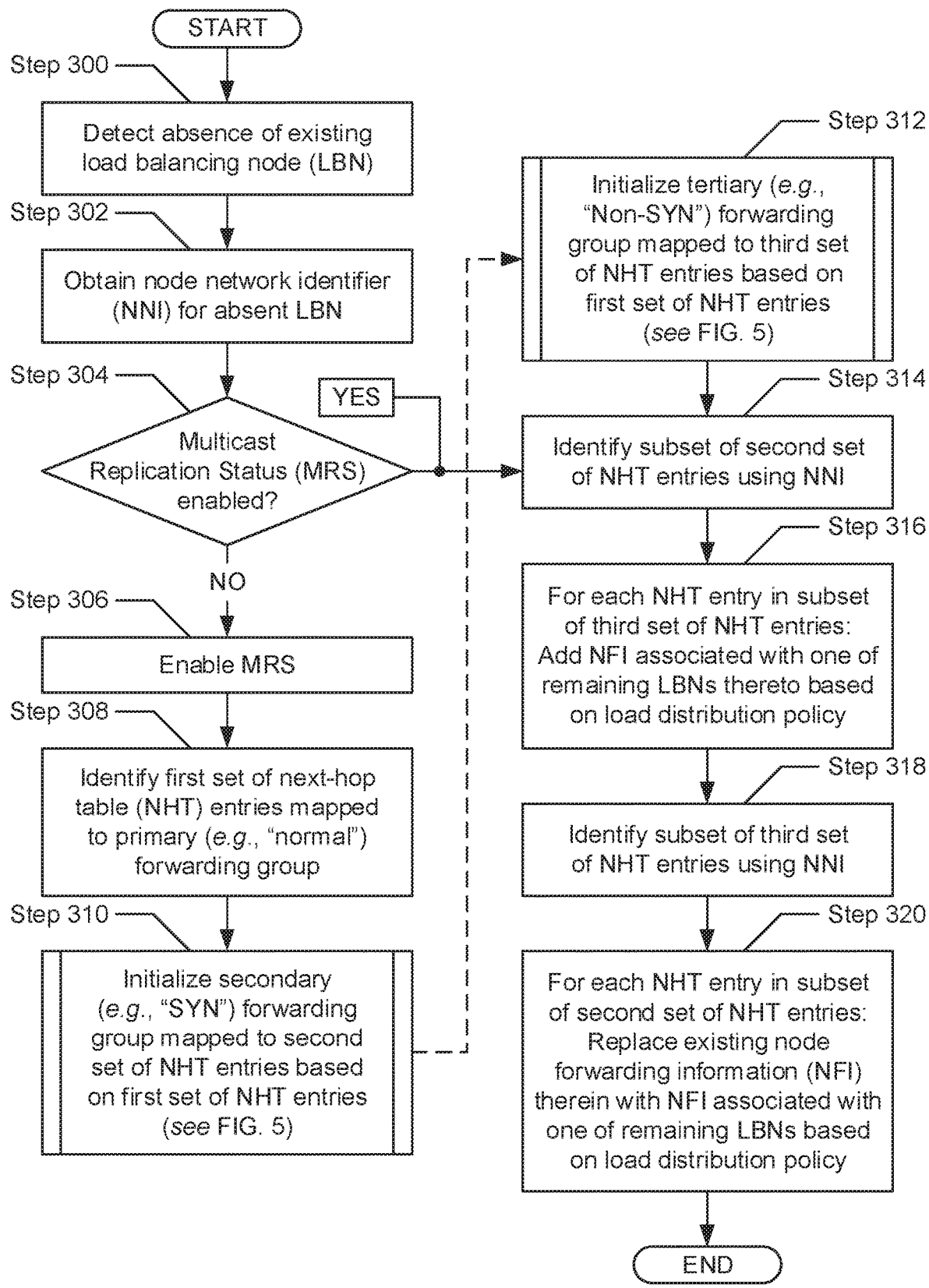
FIG. 3 shows a flowchart describing a method for updating data structures in response to the graceful removal of an existing load balancing node in accordance with one or more embodiments of the invention.

FIG. 3 shows a flowchart describing a method for updating data structures in response to the graceful removal of an existing load balancing node in accordance with one or more embodiments of the invention. The various steps outlined below may be performed by the load balancing intelligence (LBI) (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, the absence of an existing load balancing node (LBN) of the load balancing cluster (LBC) (see e.g., FIGS. 1A and 1B) is detected. In one embodiment of the invention, the detection of an absent (or unresponsive) LBN may be contingent on maintaining an awareness of the status of each LBN of the LBC. By way of an example, this awareness may be implemented through the periodic issuance of heartbeat or keep-alive protocol messages between the LBI and each LBN, which may serve to indicate whether any particular LBN may be operating normally or, for some reason, may be unresponsive or offline.

In Step 302, a node network identifier (NNI), for the absent LBN (detected in Step 300), is obtained. In one embodiment of the invention, the NNI may refer to any datum that uniquely identifies the absent LBN. For example, the NM may include, but is not limited to, a media access control (MAC) address and an Internet Protocol (IP) address associated with the absent LBN. One of ordinary skill will appreciate that additional or alternative datum, which uniquely identify the absent LBN, may be used without departing from the scope of the invention. Further, the NNI for the absent LBN may be retrieved from one or more in-memory data structures or records, which may track information concerning the one or more LBNs of the LBC.

In Step 304, a determination is made as to whether a multicast replication status (MRS) (described below) is enabled. In one embodiment of the invention, if it is determined that the MRS is disabled, then the process may proceed to Step 306. On the other hand, in another embodiment of the invention, if it is alternatively determined that the MRS is enabled, then the process may alternatively proceed to Step 314.

In one embodiment of the invention, the MRS may represent a variable or a value that acts as a signal for indicating a current state of a selective multicast replication policy, which may influence the load balancing (or distribution) of data packets received from clients to one or more LBNs of the LBC. The selective multicast replication policy may be an overriding data packet forwarding rule that, when enabled or engaged, redirects received data packets based, at least in part, on node forwarding information (NFI) (described above) programmed in one or more next-hop table (NHT) entries (see e.g., FIG. 2B) mapped to a forwarding group (e.g., an equal cost multipath (ECMP) group) (see e.g., FIGS. 2A and 2C). Selection of which forwarding group on which data packet forwarding to one or more LBNs may be based, may be contingent, at least in part, on the MRS (i.e., state of the selective multicast replication policy).

In one embodiment of the invention, the states of the MRS (coinciding with the states of the selective multicast replication policy) may include: (a) a disabled state, indicating that the forwarding of data packets from any given client to one or more LBNs should be governed by a primary (e.g., "normal") forwarding group, which may reflect data packet forwarding under normal operating conditions; and (b) an enabled state, indicating that the forwarding of data packets from any given client to one or more LBNs should be alternatively governed by a secondary (e.g., "SYN") forwarding group or a tertiary (e.g., "non-SYN") forwarding group, which may reflect data packet forwarding under abnormal operating conditions. These abnormal operating conditions may include, but are not limited to, the graceful removal of one or more LBNs from the LBC; and the hitless addition of one or more LBNs to the LBC. Subsequently, the MRS may be implemented using, for example, binary (i.e., logical one or logical zero) or Boolean (i.e., true or false) values.

In Step 306, after determining (in Step 304) that the MRS is disabled, the MRS is updated to reflect an enabled state. In one embodiment of the invention, enabling the MRS may activate the selective multicast replication policy (described above), thereby overriding the normal data packet forwarding protocol in consideration of the detection of an abnormal condition—i.e., the graceful removal of the absent LBN (detected in Step 300).

In Step 308, a first set of NHT entries, in the NHT (see e.g., FIGS. 2B and 2C), is identified. In one embodiment of the invention, the first set of NHT entries may map to the above-described primary (e.g., "normal") forwarding group. Further, identification of the first set of NHT entries may entail: (a) identifying a group lookup table (GLT) entry (see e.g., FIG. 2A) associated with the primary forwarding group—i.e., a GLT entry that includes a group identifier (GID) assigned to the primary forwarding group; (b) retrieving a group base index (GBI) and group size from the identified GLT entry; and (c) identifying the first set of NHT entries as the one or more (e.g., group size) successive NHT entries, starting with the NHT entry referenced by a next-hop table index (NTI) equaling the GBI, in the NHT. For example, if the GBI and group size are 12 and 6, respectively, then the first set of NHT entries include a lead NHT entry referenced by NTI=12 and the next five successive NHT entries following the lead NHT entry.

In Step 310, a second set of NHT entries, in the NHT, is initialized. In one embodiment of the invention, the second set of NHT entries may map to a secondary (e.g., "SYN") forwarding group. Further, the second set of NHT entries may be initialized based on the first set of NHT entries (identified in Step 308), which is described in further detail below with respect to FIG. 5. Similarly, in Step 312, a third set of NHT entries, in the NHT, is initialized. In one embodiment of the invention, the third set of NHT entries may map to a tertiary (e.g., "non-SYN") forwarding group. Moreover, the third set of NHT entries may also be initialized based on the first set of NHT entries (identified in Step 308), which is described in further detail below with respect to FIG. 5.

In Step 314, after initializing the third set of NHT entries (in Step 312) or determining (in Step 304) that the MRS is disabled, a subset of the second set of NHT entries (initialized in Step 310) is identified. In one embodiment of the invention, each NHT entry identified into the aforementioned subset of the second set of NHT entries may include a datum that matches the NNI (obtained in Step 302) associated with the absent LBN (detected in Step 300). Accordingly, each NHT entry identified into the subset of the second set of NHT entries may include node forwarding information (NFI) for the absent LBN.

In Step 316, for each NHT entry of the subset of the second set of NHT entries (identified in Step 314), an existing NFI specified therein is replaced with new NFI. In one embodiment of the invention, as mentioned above, the existing NFI specified in each NHT entry of the subset of the second set of NHT entries may pertain to the absent LBN (detected in Step 300). Further, the new NFI (with which the existing NFI is replaced) may be associated with one of the remaining (or still responsive/active) LBNs that form the LBC. Moreover, the existing NFI in each NHT entry may be replaced with new NFI pertaining to a different remaining LBN.

For example, assume the LBC had consisted of four LBNS—e.g., a first LBN, a second LBN, a third LBN, and a fourth LBN. Then, assume the third LBN is detected as being unresponsive, thus becoming the absent LBN. Subsequently, assume a subset of a set of NHT entries—e.g., five NHT entries—in the NHT, which maps to the secondary forwarding group, is identified as including forwarding information associated with the absent LBN. Accordingly, the existing NFI (associated with the absent LBN) in each of the those five NHT entries is replaced with new NFI associated with either the first LBN, the second LBN, or the fourth LBN (i.e., the remaining responsive/active LBNs forming the LBC).

In one embodiment of the invention, the selection of which new NFI (associated with one of the remaining LBNs) to replace the existing NFI specified in each or a given NHT entry of the subset of the second set of NHT entries may be determined based on a load distribution policy. The load distribution policy may refer to an algorithm (i.e., employed as a functionality of the LBI) that may intelligently redistribute node workloads, across the available LBNs forming the LBC, according to a configurable constraint. Each node workload, associated with a given LBN and at least with respect to the NHT, may be expressed through a number of NHT entries (e.g., a cardinality of a subset of NHT entries) mapped to a given forwarding group. Examples of constraints include, but are not limited to, the maintenance of equal (or near-equal) load balancing; the maintenance of skewed (or near-skewed) load balancing; the maintenance of custom pattern load balancing; or any combination thereof.

Accordingly, by way of an example, should the constraint be directed to maintaining equal (or near-equal) load balancing, the load distribution policy may include functionality, but is not limited to: (a) redistributing node workloads associated with one or more unresponsive LBNs (i.e., one or more absent LBNs) across the remaining LBNs such that the resulting workload between the remaining LBNs is equal (or near-equal); or (b) redistributing node workloads associated with an existing set of LBNs across a new set of LBNs (i.e., including the existing set and one or more added LBNs) such that the resulting workload between the new set of LBNs is equal (or near-equal).

In Step 318, a subset of the third set of NHT entries (initialized in Step 312) is identified. In one embodiment of the invention, each NHT entry identified into the subset of the third set of NHT entries may include a datum that matches the NNI (obtained in Step 302) associated with the absent LBN (detected in Step 300). Accordingly, each NHT entry identified into the subset of the third set of NHT entries may include NFI for the absent LBN. Further, both the subset of the second set of NHT entries (identified in Step 314) and the subset of the third set of NHT entries (identified in Step 318) map to a common subset of the first set of NHT entries (identified in Step 308).

In Step 320, for each NHT entry of the subset of the third set of NHT entries (identified in Step 318), an existing NFI specified therein is supplemented with new NFI. In one embodiment of the invention, as mentioned above, the existing NFI specified in each NHT entry of the subset of the third set of NHT entries may pertain to the absent LBN (detected in Step 300). Further, the new NFI (with which the existing NFI is supplemented) may be associated with one of the remaining (or still responsive/active) LBNs that form the LBC. Moreover, the existing NFI in each NHT entry may be supplemented with new NFI pertaining to a different remaining LBN.

For example, assume the LBC had consisted of four LBNS—e.g., a first LBN, a second LBN, a third LBN, and a fourth LBN. Then, assume the third LBN is detected as being unresponsive, thus becoming the absent LBN. Subsequently, assume a subset of the third set of NHT entries— e.g., five NHT entries—in the NHT, which maps to the tertiary forwarding group, is identified as including forwarding information associated with the absent LBN. Accordingly, the existing NFI (associated with the absent LBN) in each of those five NHT entries is supplemented with new NFI associated with either the first LBN, the second LBN, or the fourth LBN (i.e., the remaining responsive/active LBNs forming the LBC).

In one embodiment of the invention, the selection of which new NFI (associated with one of the remaining LBNs) to supplement the existing NFI specified in each or a given NHT entry of the subset of the third set of NHT entries may be determined based on a load distribution policy (described above).

Figure 4:
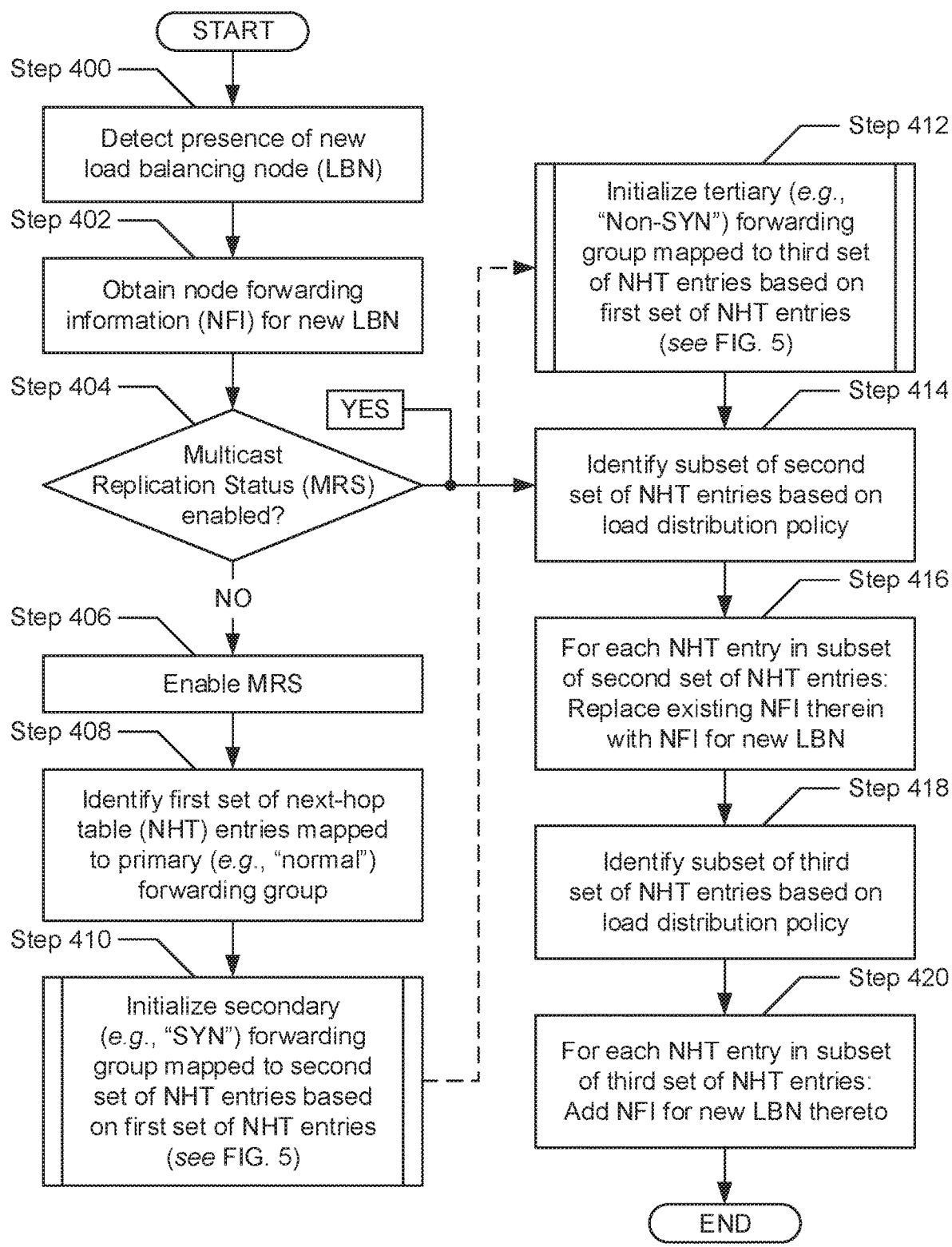
FIG. 4 shows a flowchart describing a method for updating data structures in response to the hitless addition of a new load balancing node in accordance with one or more embodiments of the invention.

FIG. 4 shows a flowchart describing a method for updating data structures in response to the hitless addition of a new load balancing node in accordance with one or more embodiments of the invention. The various steps outlined below may be performed by the load balancing intelligence (LBI) (see e.g., FIGS. 1A and 1B). Further, while the various steps in the flowcharts are presented and described sequentially, one of ordinary skill will appreciate that some or all steps may be executed in different orders, may be combined or omitted, and some or all steps may be executed in parallel.

Turning to FIG. 4, in Step 400, the presence of a new load balancing node (LBN) introduced to a load balancing cluster (LBC) (see e.g., FIGS. 1A and 1B) is detected. In one embodiment of the invention, the detection of the new LBN may be contingent on a node registration protocol. By way of an example, the node registration protocol may be manually implemented through instructions and/or information (e.g., node forwarding information (NFI) for the new LBN) provided by administrators of the LBC. By way of another example, the node registration protocol may be automatically implemented through information interchange between the LBI and the new LBN upon activation of the latter. In pursuing an automatic registration, the new LBN may (upon activation) include functionality to: contact the LBI; upon acknowledgement from the LBI, register itself using a unique identifier (e.g., a serial number, etc.); and subsequently, optionally provide NFI associated with itself to the LBI.

In Step 402, NFI for the new LBN (detected in Step 400) is obtained. In one embodiment of the invention, as described above, NFI may collectively encompass one or more pieces of information that may be necessary to forward data packets to a given LBN (e.g., the new LBN). Accordingly, NFI may include, for example, the media access control (MAC) address associated with the given LBN and a network interface of the LBI host (e.g., a network device or another LBN) that connects to the given LBN. Further, NFI may also include the Internet Protocol (IP) address and/or any other forwarding information associated with the given LBN. Subsequently, NFI for the new LBN may be obtained through a variety of methodologies including, but not limited to: (a) manual input by administrators of the LBC; (b) if an information interchange has been established with and by the new LBN (e.g., through auto-registration (described above)), examination of header information in interchange data packets (e.g., MAC frames, IP packets, etc.); and (c) the sharing of NFI associated with the new LBN by the new LBN itself or by a centralized management and/or consolidation platform (for the LBC) in response to a query directed to either the new LBN or the centralized management and/or consolidation platform.

In Step 404, a determination is made as to whether a multicast replication status (MRS) (described below) is enabled. In one embodiment of the invention, if it is determined that the MRS is disabled, then the process may proceed to Step 406. On the other hand, in another embodiment of the invention, if it is alternatively determined that the MRS is enabled, then the process may alternatively proceed to Step 414.

In one embodiment of the invention, the MRS may represent a variable or a value that acts as a signal for indicating a current state of a selective multicast replication policy, which may influence the load balancing (or distribution) of data packets received from clients to one or more LBNs of the LBC. The selective multicast replication policy may be an overriding data packet forwarding rule that, when enabled or engaged, redirects received data packets based, at least in part, on node forwarding information (NFI) (described above) programmed in one or more next-hop table (NHT) entries (see e.g., FIG. 2B) mapped to a forwarding group (e.g., an equal cost multipath (ECMP) group) (see e.g., FIGS. 2A and 2C). Selection of which forwarding group on which data packet forwarding to one or more LBNs may be based, may be contingent, at least in part, on the MRS (i.e., state of the selective multicast replication policy).

In one embodiment of the invention, the states of the MRS (coinciding with the states of the selective multicast replication policy) may include: (a) a disabled state, indicating that the forwarding of data packets from any given client to one or more LBNs should be governed by a primary (e.g., "normal") forwarding group, which may reflect data packet forwarding under normal operating conditions; and (b) an enabled state, indicating that the forwarding of data packets from any given client to one or more LBNs should be alternatively governed by a secondary (e.g., "SYN") forwarding group or a tertiary (e.g., "non-SYN") forwarding group, which may reflect data packet forwarding under abnormal operating conditions. These abnormal operating conditions may include, but are not limited to, the graceful removal of one or more LBNs from the LBC; and the hitless addition of one or more LBNs to the LBC. Subsequently, the MRS may be implemented using, for example, binary (i.e., logical one or logical zero) or Boolean (i.e., true or false) values.

In Step 406, after determining (in Step 404) that the MRS is disabled, the MRS is updated to reflect an enabled state. In one embodiment of the invention, enabling the MRS may activate the selective multicast replication policy (described above), thereby overriding the normal data packet forwarding protocol in consideration of the detection of an abnormal condition—i.e., the hitless addition of the new LBN (detected in Step 400).

In Step 408, a first set of NHT entries, in the NHT (see e.g., FIGS. 2B and 2C), is identified. In one embodiment of the invention, the first set of NHT entries may map to the above-described primary (e.g., "normal") forwarding group. Further, identification of the first set of NHT entries may entail: (a) identifying a group lookup table (GLT) entry (see e.g., FIG. 2A) associated with the primary forwarding group—i.e., a GLT entry that includes a group identifier (GID) assigned to the primary forwarding group; (b) retrieving a group base index (GBI) and group size from the identified GLT entry; and (c) identifying the first set of NHT entries as the one or more (e.g., group size) successive NHT entries, starting with the NHT entry referenced by a next-hop table index (NTI) equaling the GBI, in the NHT. For example, if the GBI and group size are 12 and 6, respectively, then the first set of NHT entries include a lead NHT entry referenced by NTI=12 and the next five successive NHT entries following the lead NHT entry.

In Step 410, a second set of NHT entries, in the NHT, is initialized. In one embodiment of the invention, the second set of NHT entries may map to a secondary (e.g., "SYN") forwarding group. Further, the second set of NHT entries may be initialized based on the first set of NHT entries (identified in Step 408), which is described in further detail below with respect to FIG. 5. Similarly, in Step 412, a third set of NHT entries, in the NHT, is initialized. In one embodiment of the invention, the third set of NHT entries may map to a tertiary (e.g., "non-SYN") forwarding group. Moreover, the third set of NHT entries may also be initialized based on the first set of NHT entries (identified in Step 408), which is described in further detail below with respect to FIG. 5

In Step 414, after initializing the third set of NHT entries (in Step 412) or determining (in Step 404) that the MRS is disabled, a subset of the second set of NHT entries (initialized in Step 410) is identified. In one embodiment of the invention, the subset of the second set of NHT entries may be selected based on a load distribution policy. The load distribution policy may refer to an algorithm (i.e., employed as a functionality of the LBI) that may intelligently redistribute node workloads, across the available LBNs forming the LBC, according to a configurable constraint. Each node workload, associated with a given LBN and at least with respect to the NHT, may be expressed through a number of NHT entries (e.g., a cardinality of a subset of NHT entries) mapped to a given forwarding group. Examples of constraints include, but are not limited to, the maintenance of equal (or near-equal) load balancing; the maintenance of skewed (or near-skewed) load balancing; the maintenance of custom pattern load balancing; or any combination thereof.

Accordingly, by way of an example, should the constraint be directed to maintaining equal (or near-equal) load balancing, the load distribution policy may include functionality, but is not limited to: (a) redistributing node workloads associated with one or more unresponsive LBNs (i.e., one or more absent LBNs) across the remaining LBNs such that the resulting workload between the remaining LBNs is equal (or near-equal); or (b) redistributing node workloads associated with an existing set of LBNs across a new set of LBNs (i.e., including the existing set and one or more added LBNs) such that the resulting workload between the new set of LBNs is equal (or near-equal).

In Step 416, for each NHT entry of the subset of the second set of NHT entries (identified in Step 414), an existing NFI specified therein is replaced with new NFI. In one embodiment of the invention, the existing NFI specified in each NHT entry of the subset of the second set of NHT entries may pertain to one of the existing LBNs that had formed the LBC (i.e., prior to the introduction of the new LBN). Further, the new NFI (with which the existing NFI is replaced) may be associated with the new LBN (detected in Step 400).

For example, assume the LBC had consisted of three LBNS—e.g., a first LBN, a second LBN, and a third LBN. Then, assume a fourth LBN is detected, thus becoming the new LBN. Subsequently, assume a subset of a set of NHT entries—e.g., five NHT entries—in the NHT, which maps to the secondary forwarding group, is identified based on the load distribution policy. Accordingly, the existing NFI (associated with either the first LBN, the second LBN, or the third LBN) in each of those five NHT entries is replaced with new NFI associated with the new LBN.

In Step 418, a subset of the third set of NHT entries (initialized in Step 412) is identified. In one embodiment of the invention, the subset of the third set of NHT entries may be selected based on a load distribution policy (described above), which may be programmed to maintain a configurable constraint. Further, both the subset of the second set of NHT entries (identified in Step 414) and the subset of the third set of NHT entries (identified in Step 418) map to a common subset of the first set of NHT entries (identified in Step 408).

In Step 420, for each NHT entry of the subset of the third set of NHT entries (identified in Step 418), an existing NFI specified therein is supplemented with new NFI. In one embodiment of the invention, the existing NFI specified in each NHT entry of the subset of the third set of NHT entries may pertain to one of the existing LBNs that had formed the LBC (i.e., prior to the introduction of the new LBN). Further, the new NFI (with which the existing NFI is supplemented) may be associated with the new LBN (detected in Step 400).

For example, assume the LBC had consisted of three LBNS—e.g., a first LBN, a second LBN, and a third LBN. Then, assume a fourth LBN is detected, thus becoming the new LBN. Subsequently, assume a subset of a set of NHT entries—e.g., five NHT entries—in the NHT, which maps to the tertiary forwarding group, is identified based on the load distribution policy. Accordingly, the existing NFI (associated with either the first LBN, the second LBN, or the third LBN) in each of those five NHT entries is supplemented with new NFI associated with the new LBN.

Figure 5:
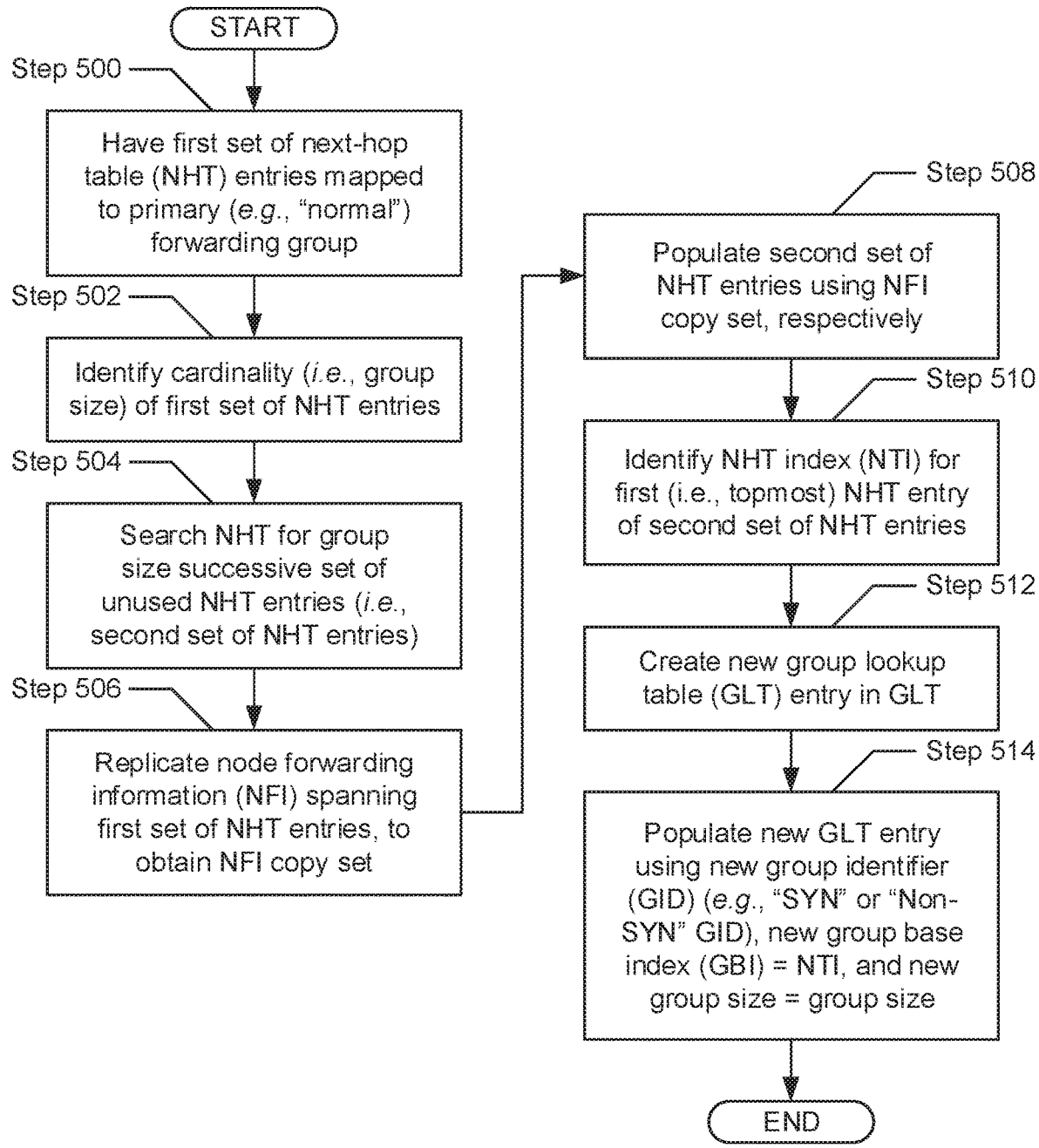
FIG. 5 shows a flowchart describing a method for initializing a forwarding group in accordance with one or more embodiments of the invention.

FIG. 5 shows a flowchart describing a method for initializing a forwarding group in accordance with one or more embodiments of the invention. The various steps outlined below may be performed by the load balancing intelligence (LBI) (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, a first set of next-hop table (NHT) (see e.g., FIGS. 2B and 2C) entries is had (i.e., already obtained or identified) (see e.g., FIGS. 3 and/or 4). In one embodiment of the invention, the first set of NHT entries may map to a primary (e.g., "normal") forwarding group, which may govern data packet forwarding under normal operating conditions.

In Step 502, a cardinality of the aforementioned first set of NHT entries is identified. In one embodiment of the invention, the cardinality of the first set of NHT entries may refer to a number of individual NHT entries forming the first set of NHT entries (also referred to as the group size associated with the primary forwarding group). Further, identification of the cardinality (or group size) may entail retrieving the information from a group lookup table (GLT) (see e.g., FIGS. 2A and 2C) entry associated with the primary forwarding group.

In Step 504, a search is performed on the NHT. In one embodiment of the invention, the search may be directed to identifying a set of unused (i.e., unoccupied or unreferenced), successive NHT entries in the NHT, where the number of individual NHT entries forming the sought set of unused, successive NHT entries equals the cardinality of the first set of NHT entries (identified in Step 502). The aforementioned set of unused, successive NHT entries may be referred hereinafter as the second set of NHT entries.

In Step 506, node forwarding information (NFI) (described above), spanning the first set of NHT entries (retained in Step 500), is replicated. That is, in one embodiment of the invention, NFI specified in each NHT entry of the first set of NHT entries may be replicated to produce a NFI copy. Further, in producing a NFI copy of NFI in each NHT entry, a NFI copy set (or a set of NFI copies) is obtained.

In Step 508, the second set of NHT entries (searched for in Step 504) is populated. More specifically, in one embodiment of the invention, the second set of NHT entries may be populated using the NFI copy set (obtained in Step 506), respectively. That is, by way of an example, assume the first set of NHT entries includes three individual NHT entries. Subsequently, because the second set of NHT entries and the first set of NHT entries share a common cardinality, then the second set of NHT entries also includes three individual NHT entries. Further, through replication of NFI spanning the first set of NHT entries, a NFI copy set includes three NFI copies—e.g., a first NFI copy of NFI specified in a first NHT entry of the first set of NHT entries, a second NFI copy of NFI specified in a second NHT entry of the first set of NHT entries, and a third NFI copy of NFI specified in a third NHT entry of the first set of NHT entries. Based on the aforementioned thus far, population of the second set of NHT entries using the NFI copy set may entail: populating a first NHT entry of the second set of NHT entries using the first NFI copy of the NFI copy set; populating a second NHT entry of the second set of NHT entries using the second NFI copy of the NFI copy set; and populating a third NHT entry of the second set of NHT entries using the third NFI copy of the NFI copy set. Accordingly, the NFI, spanning across the first set of NHT entries, is duplicated and disseminated across the second set of NHT entries.

In Step 510, a next-hop table index (NTI) is identified. In one embodiment of the invention, the NTI may reference a position in the NHT, with which a first (or topmost) NHT entry of the second set of NHT entries is associated. Identification of the NTI may entail retrieving the NTI variable or value specified in the aforementioned first (or topmost) NHT entry of the second set of NHT entries.

In Step 512, a new GLT (see e.g., FIGS. 2A and 2C) entry is created. Specifically, in one embodiment of the invention, memory and/or storage resources may be allotted and consumed to allocate an additional (i.e., new) GLT entry in the GLT. Thereafter, in Step 514, the new GLT entry (created in Step 512) is populated. More specifically, in one embodiment of the invention, the new GLT entry may be populated with at least the following information: (a) a new group identifier (GID) assigned to the forwarding group (e.g., a "SYN" or a "non-SYN" forwarding group) being initialized by way of the outlined method; (b) a new group base index (GBI) referencing the NTI (identified in Step 510); and (c) a new group size matching the cardinality of the first set of NHT entries (identified in Step 502). The new GLT entry, or any given GLT entry, is not limited to including the aforementioned information.

Figure 6:
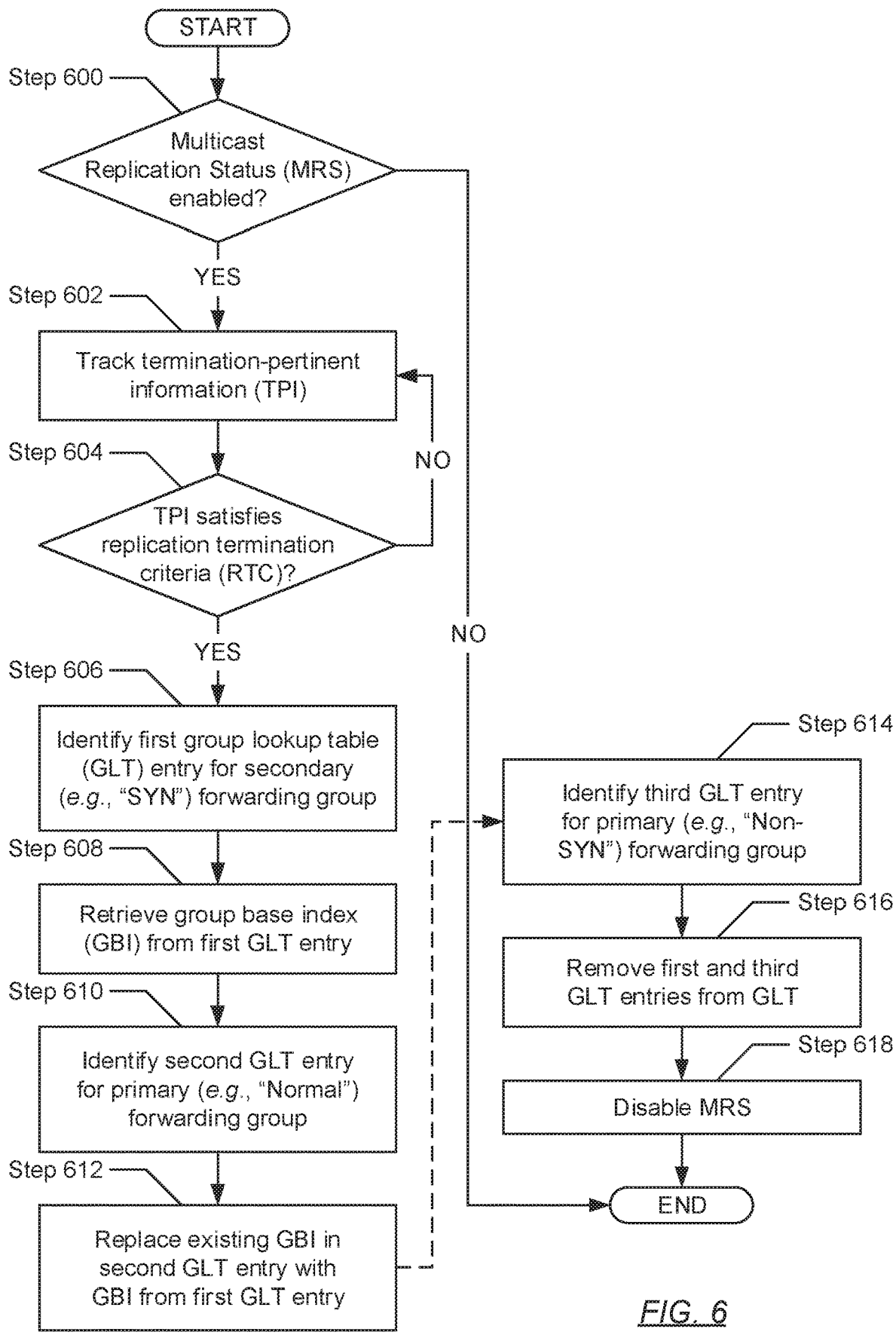
FIG. 6 shows a flowchart describing a method for terminating multicast replication in accordance with one or more embodiments of the invention.

FIG. 6 shows a flowchart describing a method for terminating multicast replication in accordance with one or more embodiments of the invention. The various steps outlined below may be performed by the load balancing intelligence (LBI) (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 6, in Step 600, a determination is made as to whether a multicast replication status (MRS) (described below) is enabled. In one embodiment of the invention, if it is determined that the MRS is enabled, then the process may proceed to Step 602. On the other hand, in another embodiment of the invention, if it is alternatively determined that the MRS is disabled, then the process may alternatively end.

In one embodiment of the invention, the MRS may represent a variable or a value that acts as a signal for indicating a current state of a selective multicast replication policy, which may influence the load balancing (or distribution) of data packets received from clients to one or more load balancing nodes (LBNs) of the load balancing cluster (LBC). The selective multicast replication policy may be an overriding data packet forwarding rule that, when enabled or engaged, redirects received data packets based, at least in part, on node forwarding information (NFI) (described above) programmed in one or more next-hop table (NHT) (see e.g., FIG. 2B) entries mapped to a forwarding group (e.g., an equal cost multipath (ECMP) group) (see e.g., FIGS. 2A and 2B). Selection of which forwarding group on which data packet forwarding to one or more LBNs may be based, may be contingent, at least in part, on the MRS (i.e., state of the selective multicast replication policy).

In one embodiment of the invention, the states of the MRS (coinciding with the states of the selective multicast replication policy) may include: (a) a disabled state, indicating that the forwarding of data packets from any given client to one or more LBNs should be governed by a primary (e.g., "normal") forwarding group, which may reflect data packet forwarding under normal operating conditions; and (b) an enabled state, indicating that the forwarding of data packets from any given client to one or more LBNs should be alternatively governed by a secondary (e.g., "SYN") forwarding group or a tertiary (e.g., "non-SYN") forwarding group, which may reflect data packet forwarding under abnormal operating conditions. These abnormal operating conditions may include, but are not limited to, the graceful removal of one or more LBNs from the LBC; and the hitless addition of one or more LBNs to the LBC. Subsequently, the MRS may be implemented using, for example, binary (i.e., logical one or logical zero) or Boolean (i.e., true or false) values.

In Step 602, after determining (in Step 600) that the MRS is enabled, termination-pertinent information (TPI) is/are tracked. TPI may collectively refer to one or more variables (or values) that may be monitored in order to trigger the termination of the selective multicast replication policy (described above). In one embodiment of the invention, TPI may include a countdown timer (i.e., a clock variable that counts down from a certain configurable granularity of time). In such an embodiment, the granularity of time from which the countdown begins may be comparable to a length of time that any given client session (described above) may be expected to last. In another embodiment of the invention, when gracefully removing an existing LBN from the LBC, TPI may include a connection counter. In such an embodiment, the collection counter may represent a variable that tallies or enumerates the number of remaining, active client sessions between one or more clients and the existing LBN.

In yet another embodiment of the invention, when undergoing the hitless addition of a new LBN to the LBC, TPI may include a packet discard rate. In such an embodiment, the packet discard rate may represent a variable that measures the number of data packets dropped by the new LBN over a specified interval of time. Further, the new LBN may drop certain data packets (e.g., non-SYN data packets) for client sessions for which state may not be maintained thereon. As described above, in receiving data packets for a client session for which a LBN does not maintain state, the LBN may conventionally respond by transmitting reset (RST) packets back to the client. However, in implementing load balancing through selective multicast replication in accordance with embodiments of the invention, the LBN may be configured to alternatively respond by dropping data packets for client sessions for which the LBN does not maintain state and, subsequently, refrain from transmitting the aforementioned RST packets. One of ordinary skill will appreciate that additional or alternative TPI may be employed without departing from the scope of the invention.

In Step 604, a determination is made as to whether TPI (tracked in Step 602) satisfies replication termination criteria (RTC). RTC may collectively refer to one or more thresholds, respective to one or more variables representative of TPI, respectively, which when satisfied or met, trigger the termination of the selective multicast replication policy (described above). In one embodiment of the invention, when the TPI includes a countdown timer, a respective RTC may specify a zero time value as a threshold for terminating the selective multicast replication policy. That is, in such an embodiment, upon the countdown timer elapsing, thereby arriving at the zero time value, the selective multicast replication policy terminates. In another embodiment of the invention, when gracefully removing an existing LBN from the LBC and the TPI includes a connection counter, a respective RTC may specify a zero connection value as a threshold for terminating the selective multicast replication policy. That is, in such an embodiment, upon the connection counter reaching the zero connection value, thereby reflecting that there are zero remaining, active client sessions between one or more clients and the existing LBN, the selective multicast replication policy terminates. In yet another embodiment of the invention, when undergoing the hitless addition of a new LBN to the LBC and TPI includes a packet discard rate, a respective RTC may specify a threshold packet discard rate as a threshold for terminating the selective multicast replication policy. That is, in such an embodiment, upon the packet discard rate falling below the threshold packet discard rate, thereby indicating that data packets dropped by the new LBN has not been increasing for a given interval of time, the selective multicast replication policy terminates. One of ordinary skill will appreciate that additional or alternative RTC, respective to the TPI, may be employed without departing from the scope of the invention.

Accordingly, in Step 604, in one embodiment of the invention, if it is determined that the TPI satisfies the respective RTC, then the process may proceed to Step 606. On the other hand, in another embodiment of the invention, if it is alternatively determined that the TPI fails to satisfy the respective RTC, then the process may alternatively proceed to Step 602, where the tracking of TPI continues.

In Step 606, after determining (in Step 604) that the TPI (tracked in Step 602) satisfies the respective RTC, a first group lookup table (GLT) (see e.g., FIG. 2A) entry is identified. In one embodiment of the invention, the first GLT entry may associate with a secondary (e.g., "SYN") forwarding group. The secondary forwarding group may govern the forwarding of synchronize (SYN) data packets under abnormal operating conditions. Abnormal operating conditions include, but are not limited to, the graceful removal of one or more existing LBNs from the LBC, and/or the hitless addition of one or more new LBNs to the LBC. Further, a SYN data packet may refer to a first data packet transmitted in any client session interchange (described above), which may be sent by a client to indicate that a new connection, yet to be established, is sought. Moreover, identification of the first GLT entry may entail performing a lookup on the GLT using a group identifier (GID) assigned to the secondary forwarding group, where the first GLT entry at least specifies a GID therein matching the GID used in the lookup.

In Step 608, from the first GLT entry (identified in Step 606), a group base index (GBI) is retrieved. In one embodiment of the invention, the GBI may represent a variable or value that references a next-hop table index (NTI) found in a next-hop table (NHT) (see e.g., FIG. 2B). The NTI may indicate a position, in the NHT, with which a NHT entry is associated, where the NHT entry represents a first (or topmost) NHT entry of a set of NHT entries mapped to the secondary forwarding group.

In Step 610, a second GLT entry is identified. In one embodiment of the invention, the second GLT entry may associate with a primary (e.g., "normal") forwarding group. The primary forwarding group may govern the forwarding of any (e.g., SYN and non-SYN) data packets under normal operating conditions. Further, identification of the second GLT entry may entail performing a lookup on the GLT using a GID assigned to the primary forwarding group, where the second GLT entry at least specifies a GID therein matching the GID used in the lookup.

In Step 612, regarding the second GLT entry (identified in Step 610), the existing GBI specified therein is replaced. Specifically, in one embodiment of the invention, the existing GBI of the second GLT entry may be replaced with the GBI of the first GLT entry (retrieved therefrom in Step 608). Further, by way of the replacement, the primary forwarding group assumes a mapping to a set of NHT entries, which had originally been associated with the secondary forwarding group. In remapping the set of NHT entries to the primary forwarding group, updates to forwarding information reflective of an updated LBC configuration (i.e., which may account for the removal or addition of one or more given LBNs) are carried over so that the primary forwarding group, which governs the forwarding of any (i.e., SYN and non-SYN) data packets under normal operating conditions, is current respective to the updated LBC configuration.

In Step 614, a third GLT entry is identified. In one embodiment of the invention, the third GLT entry may associate with a tertiary (e.g., "non-SYN") forwarding group. The tertiary forwarding group may govern the forwarding of non-synchronize (non-SYN) data packets under any of the above-mentioned abnormal operating conditions. Further, identification of the third GLT entry may entail performing a lookup on the GLT using a GID assigned to the tertiary forwarding group, where the third GLT entry at least specifies a GID therein matching the GID used in the lookup.

In Step 616, the first GLT entry (identified in Step 606) and the third GLT entry (identified in Step 614) are subsequently removed from the GLT. In one embodiment of the invention, deletion of the first and third GLT entries may entail deallocating memory and/or storage resources used in the creation of, and the tracking of information pertinent to, the first and third GLT entries associated with the secondary and tertiary forwarding groups, respectively. Thereafter, in Step 618, the MRS is updated to reflect a disabled state. In one embodiment of the invention, disabling the MRS may deactivate the selective multicast replication policy (described above), thereby re-asserting the normal data packet forwarding protocol followed under normal operating conditions.

Figure 7A:
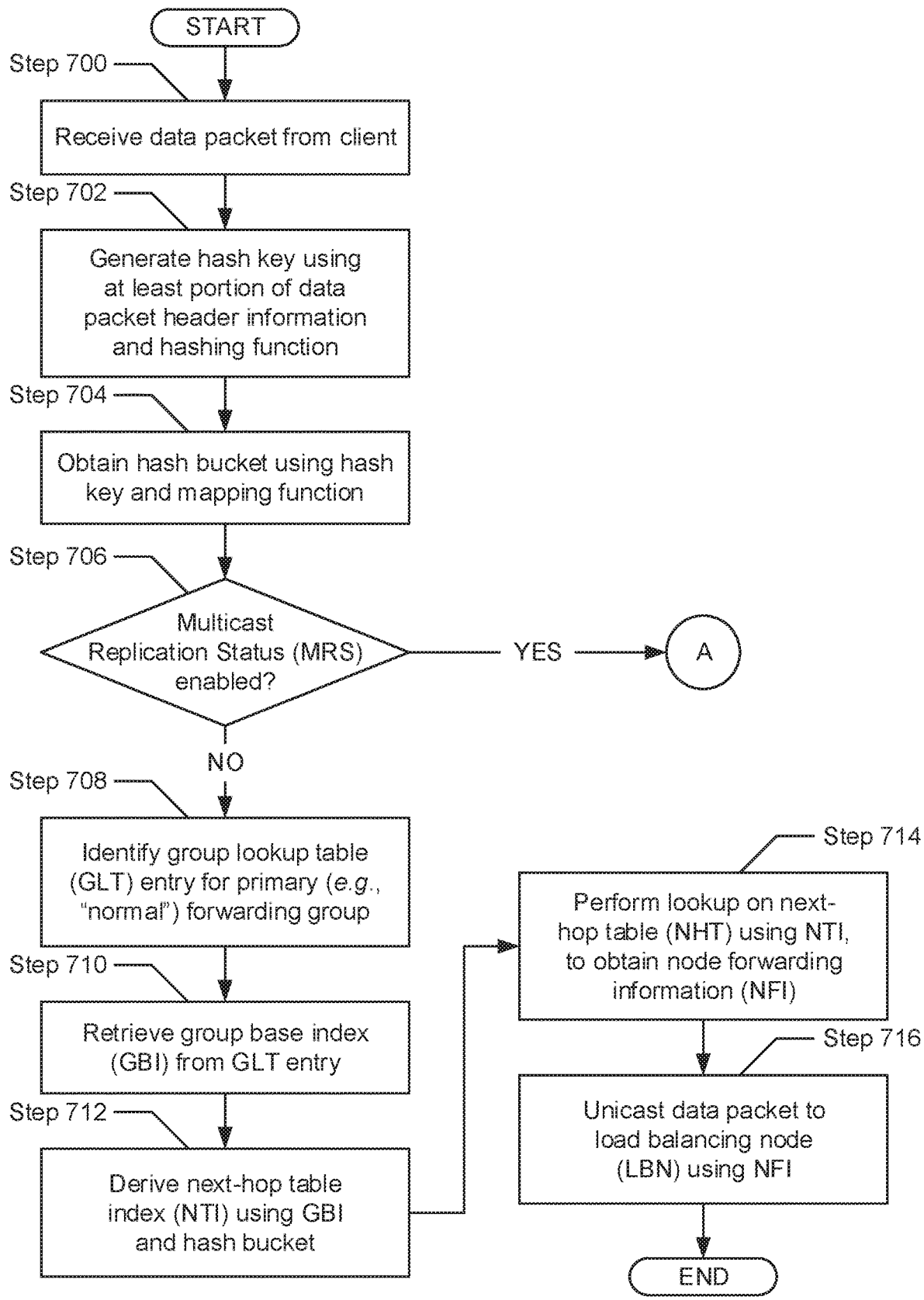
FIGS. 7A and 7B show flowcharts describing a method for forwarding a data packet in accordance with one or more embodiments of the invention.
Figure 7B:
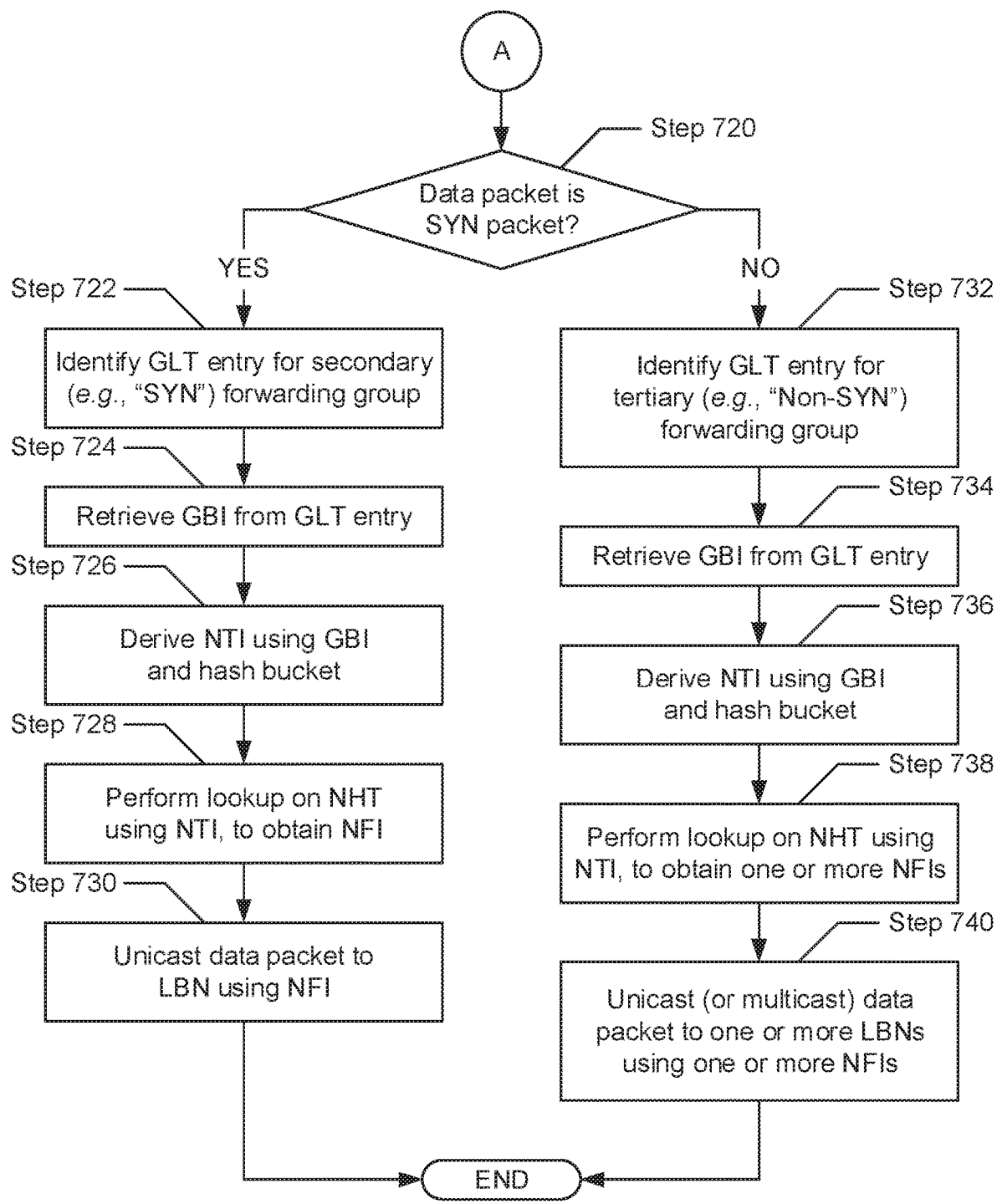

FIGS. 7A and 7B show flowcharts describing a method for forwarding a data packet in accordance with one or more embodiments of the invention. The various steps outlined below may be performed by the load balancing intelligence (LBI) (see e.g., FIGS. 1A and 1B). Further, while the various steps in the flowcharts are presented and described sequentially, one of ordinary skill will appreciate that some or all steps may be executed in different orders, may be combined or omitted, and some or all steps may be executed in parallel.

Turning to FIG. 7A, in Step 700, a data packet is received from a client (see e.g., FIGS. 1A and/or 1B). In one embodiment of the invention, the data packet may include, but is not limited to, an assortment of header information, a data payload, and cyclic redundancy check (CRC) and/or checksum information. Further, the assortment of header information may include, but is not limited to including any subset or all of the following: an Internet Protocol (IP) version; a type of transport protocol (e.g., transmission control protocol (TCP), user datagram protocol (UDP), etc.); a source IP address associated with the client; a destination IP address (i.e., a virtual IP address) associated with the load balancing cluster (LBC); a source media access control (MAC) address associated with the client; a destination MAC address associated with a given load balancing node (LBN) forming the LBC; a virtual local area network (VLAN) tag pertaining to a VLAN with which the data packet may be associated; a source network interface or port (on the client) from which the data packet had been transmitted; and a destination network interface or port (on a given LBN) at which the data packet is intended to be received.

In Step 702, a hash key is generated using at least a portion of the header information (included in the data packet received in Step 700) and a hashing function. In one embodiment of the invention, the hashing function may refer to an algorithm that translates data, of any arbitrary length, to hash keys. The aforementioned arbitrary-length data may also be referred to as the hashing function input, which may encompass a data item or, alternatively, a combination of two or more data items that, at least in part, form the header information. For example, the hashing function input may entail the concatenation of the source IP address, the destination MAC address, and the destination network interface in any predetermined order. Further, examples of the hashing function may include, but is not limited to, the Secure Hash Algorithm (SHA) family of hashing functions, the Message-Digest (MD) family of hashing functions, the Pearson hashing function, etc.

In Step 704, a hash bucket is obtained using the hash key (generated in Step 702) and a mapping function. In one embodiment of the invention, the mapping function may refer to an algorithm that maps hash keys to hash buckets. A hash bucket, in turn, may refer to a numerical value (e.g., any natural number including zero) that is representative of a group base offset (GBO), which may reflect a distance (i.e., number of next-hop table (NHT) (see e.g., FIG. 2C) entries) from a lead or reference NHT entry in the NHT. An example of the mapping function may include, but is not limited to, the modulo mapping function.

In Step 706, a determination is made as to whether a multicast replication status (MRS) (described below) is enabled. In one embodiment of the invention, if it is determined that the MRS is disabled, then the process may proceed to Step 708. On the other hand, in another embodiment of the invention, if it is alternatively determined that the MRS is enabled, then the process may alternatively proceed to Step 720 (see e.g., FIG. 7B).

In one embodiment of the invention, the MRS may represent a variable or a value that acts as a signal for indicating a current state of a selective multicast replication policy, which may influence the load balancing (or distribution) of data packets received from clients to one or more LBNs of the LBC. The selective multicast replication policy may be an overriding data packet forwarding rule that, when enabled or engaged, redirects received data packets based, at least in part, on node forwarding information (NFI) (described above) programmed in one or more next-hop table (NHT) (see e.g., FIG. 2B) entries mapped to a forwarding group (e.g. an equal cost multipath (ECMP) group) (see e.g., FIGS. 2A and 2B). Selection of which forwarding group on which data packet forwarding to one or more LBNs may be based, may be contingent, at least in part, on the MRS (i.e., state of the selective multicast replication policy).

In one embodiment of the invention, the states of the MRS (coinciding with the states of the selective multicast replication policy) may include: (a) a disabled state, indicating that the forwarding of data packets from any given client to one or more LBNs should be governed by a primary (e.g., "normal") forwarding group, which may reflect data packet forwarding under normal operating conditions; and (b) an enabled state, indicating that the forwarding of data packets from any given client to one or more LBNs should be alternatively governed by a secondary (e.g., "SYN") forwarding group or a tertiary (e.g., "non-SYN") forwarding group, which may reflect data packet forwarding under abnormal operating conditions. These abnormal operating conditions may include, but are not limited to, the graceful removal of one or more LBNs from the LBC; and the hitless addition of one or more LBNs to the LBC. Subsequently, the MRS may be implemented using, for example, binary (i.e., logical one or logical zero) or Boolean (i.e., true or false) values.

In Step 708, after determining (in Step 706) that the MRS is disabled, a group lookup table (GLT) (see e.g., FIG. 2A) entry is identified. In one embodiment of the invention, the GLT entry may associate with a primary (e.g., "normal") forwarding group. The primary forwarding group may govern the forwarding of any (e.g., SYN and non-SYN) data packets under normal operating conditions.

In Step 710, from the GLT entry (identified in Step 708), a group base index (GBI) is retrieved. In one embodiment of the invention, the GBI may represent a variable or value that references a next-hop table index (NTI) found in a next-hop table (NHT) (see e.g., FIG. 2B). The NTI may indicate a position, in the NHT, with which a NHT entry is associated, where the NHT entry represents a first (or topmost) NHT entry of a set of NHT entries mapped to the primary forwarding group.

In Step 712, a NTI is derived using the GBI (retrieved in Step 710) and the hash bucket (obtained in Step 704). Specifically, in one embodiment of the invention, the GBI and the hash bucket may be summed together to yield the NTI—i.e., GBI+hash bucket=NTI. Accordingly, the derived NTI may indicate a position, in the NHT, with which a certain NHT entry of a set of NHT entries is associated, where the set of NHT entries maps to the primary forwarding group (identified in Step 708). Further, whereas the GBI references a lead or starting NHT entry, the hash bucket, on the other hand, reflects an offset (e.g., a group base offset) relative to the lead NHT entry, at which the certain NHT entry is positioned.

In Step 714, a lookup is subsequently performed on the NHT using the NTI (derived in Step 712). In one embodiment of the invention, the lookup may entail searching for and identifying a NHT entry that at least includes, and may be referenced by, another NTI that matches the derived NTI. Further, upon identifying the NHT entry, node forwarding information (NFI) may be obtained therefrom. The NFI may include, but is not limited to, the media access control (MAC) address associated with a given LBN forming the LBC, a network interface of the LBI host (e.g., a network device or another LBN) that connects to the given LBN, and/or the Internet Protocol (IP) address associated with the given LBN. Thereafter, in Step 716, the data packet (received in Step 700) is transmitted as a unicast (i.e., single destination) data packet to the given LBN associated with the NFI (obtained in Step 714).

Turning to FIG. 7B, in Step 720, after determining (in Step 706) that the MRS is enabled, a determination is made as to whether the data packet (received in Step 700) is a synchronize (SYN) data packet. A SYN data packet may refer to a first data packet transmitted in any client session interchange, which may be sent by a client to indicate that a new connection, yet to be established, is sought. Further, a client session may refer to an information interchange between a querying client and one or more LBNs forming the LBC, which may involve the communication of various data packets in each direction. In contrast, a non-SYN data packet may refer to any given data packet transmitted subsequent to the first (or SYN) data packet in any given client session interchange. Moreover, determining whether the data packet (received in Step 700) is a SYN data packet may entail examining header information in the data packet for protocol associated flags (e.g., 1-bit Boolean fields), which control the state of the connection between the querying client and the LBN(s). One of the protocol associated flags may represent a variable or a value that acts as a signal to indicate whether the data packet is a SYN data packet—e.g., (a) when enabled, the SYN flag may indicate or identify that the data packet is a SYN data packet; or (b) when disabled, the SYN flag may indicate or identify that the data packet is a non-SYN data packet.

Accordingly, in one embodiment of the invention, if it is determined that the data packet (received in Step 700) is a SYN data packet, then the process may proceed to Step 722. On the other hand, in another embodiment of the invention, if it is alternatively determined that the data packet is a non-SYN data packet, then the process may alternatively proceed to Step 732.

In Step 722, after determining (in Step 720) that the data packet (received in Step 700) is a SYN data packet, a GLT (see e.g., FIG. 2A) entry is identified. In one embodiment of the invention, the GLT entry may associate with a secondary (e.g., "SYN") forwarding group. The secondary forwarding group may govern the forwarding of SYN data packets under abnormal operating conditions. Abnormal operating conditions include, but are not limited to, the graceful removal of one or more existing LBNs from the LBC, and/or the hitless addition of one or more new LBNs to the LBC.

In Step 724, from the GLT entry (identified in Step 722), a GBI is retrieved. In one embodiment of the invention, the GBI may represent a variable or value that references a NTI found in the NHT (see e.g., FIG. 2B). The NTI may indicate a position, in the NHT, with which a NHT entry is associated, where the NHT entry represents a first (or topmost) NHT entry of a set of NHT entries mapped to the secondary forwarding group.

In Step 726, a NTI is derived using the GBI (retrieved in Step 724) and the hash bucket (obtained in Step 704). Specifically, in one embodiment of the invention, the GBI and the hash bucket may be summed together to yield the NTI—i.e., GBI+hash bucket=NTI. Accordingly, the derived NTI may indicate a position, in the NHT, with which a certain NHT entry of a set of NHT entries is associated, where the set of NHT entries maps to the secondary forwarding group (identified in Step 722). Further, whereas the GBI references a lead or starting NHT entry, the hash bucket, on the other hand, reflects an offset (e.g., a group base offset) relative to the lead NHT entry, at which the certain NHT entry is positioned.

In Step 728, a lookup is subsequently performed on the NHT using the NTI (derived in Step 726). In one embodiment of the invention, the lookup may entail searching for and identifying a NHT entry that at least includes, and may be referenced by, another NTI that matches the derived NTI. Further, upon identifying the NHT entry, NFI may be obtained therefrom. The NFI may include, but is not limited to, the MAC address associated with a given LBN forming the LBC, a network interface of the LBI host (e.g., a network device or another LBN) that connects to the given LBN, and/or IP address associated with the given LBN. Thereafter, in Step 730, the data packet (received in Step 700) is transmitted as a unicast (i.e., single destination) data packet to the given LBN associated with the NFI (obtained in Step 728).

In Step 732, after alternatively determining (in Step 720) that the data packet (received in Step 700) is a non-SYN data packet, a GLT (see e.g., FIG. 2A) entry is identified. In one embodiment of the invention, the GLT entry may associate with a tertiary (e.g., "non-SYN") forwarding group. The tertiary forwarding group may govern the forwarding of non-SYN data packets under any of the above-mentioned abnormal operating conditions.

In Step 734, from the GLT entry (identified in Step 732), a GBI is retrieved. In one embodiment of the invention, the GBI may represent a variable or value that references a NTI found in the NHT (see e.g., FIG. 2B). The NTI may indicate a position, in the NHT, with which a NHT entry is associated, where the NHT entry represents a first (or topmost) NHT entry of a set of NHT entries mapped to the tertiary forwarding group.

In Step 736, a NTI is derived using the GBI (retrieved in Step 734) and the hash bucket (obtained in Step 704). Specifically, in one embodiment of the invention, the GBI and the hash bucket may be summed together to yield the NTI—i.e., GBI+hash bucket=NTI. Accordingly, the derived NTI may indicate a position, in the NHT, with which a certain NHT entry of a set of NHT entries is associated, where the set of NHT entries maps to the tertiary forwarding group (identified in Step 732). Further, whereas the GBI references a lead or starting NHT entry, the hash bucket, on the other hand, reflects an offset (e.g., a group base offset) relative to the lead NHT entry, at which the certain NHT entry is positioned.

In Step 738, a lookup is subsequently performed on the NHT using the NTI (derived in Step 736). In one embodiment of the invention, the lookup may entail searching for and identifying a NHT entry that at least includes, and may be referenced by, another NTI that matches the derived NTI. Further, upon identifying the NHT entry, one or more NFI may be obtained therefrom. Each NFI may include, but is not limited to, the MAC address associated with a given LBN forming the LBC, a network interface of the LBI host (e.g., a network device or another LBN) that connects to the given LBN, and/or IP address associated with the given LBN. Thereafter, in Step 740, the data packet (received in Step 700) is transmitted. In one embodiment, if a single NFI is retrieved from the NHT entry, then the data packet may be transmitted as a unicast (i.e., single destination) data packet to the given LBN associated with the single NFI. In another embodiment of the invention, if multiple NFI are alternatively retrieved from the NHT entry, then the data packet may be transmitted as a multicast (i.e., simultaneous multiple destinations) data packet directed to multiple LBNs associated with the multiple NFI, respectively.

FIG. 8 shows a computing system in accordance with one or more embodiments of the invention. The computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device. Further, the communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

In one embodiment of the invention, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same as or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 9B:
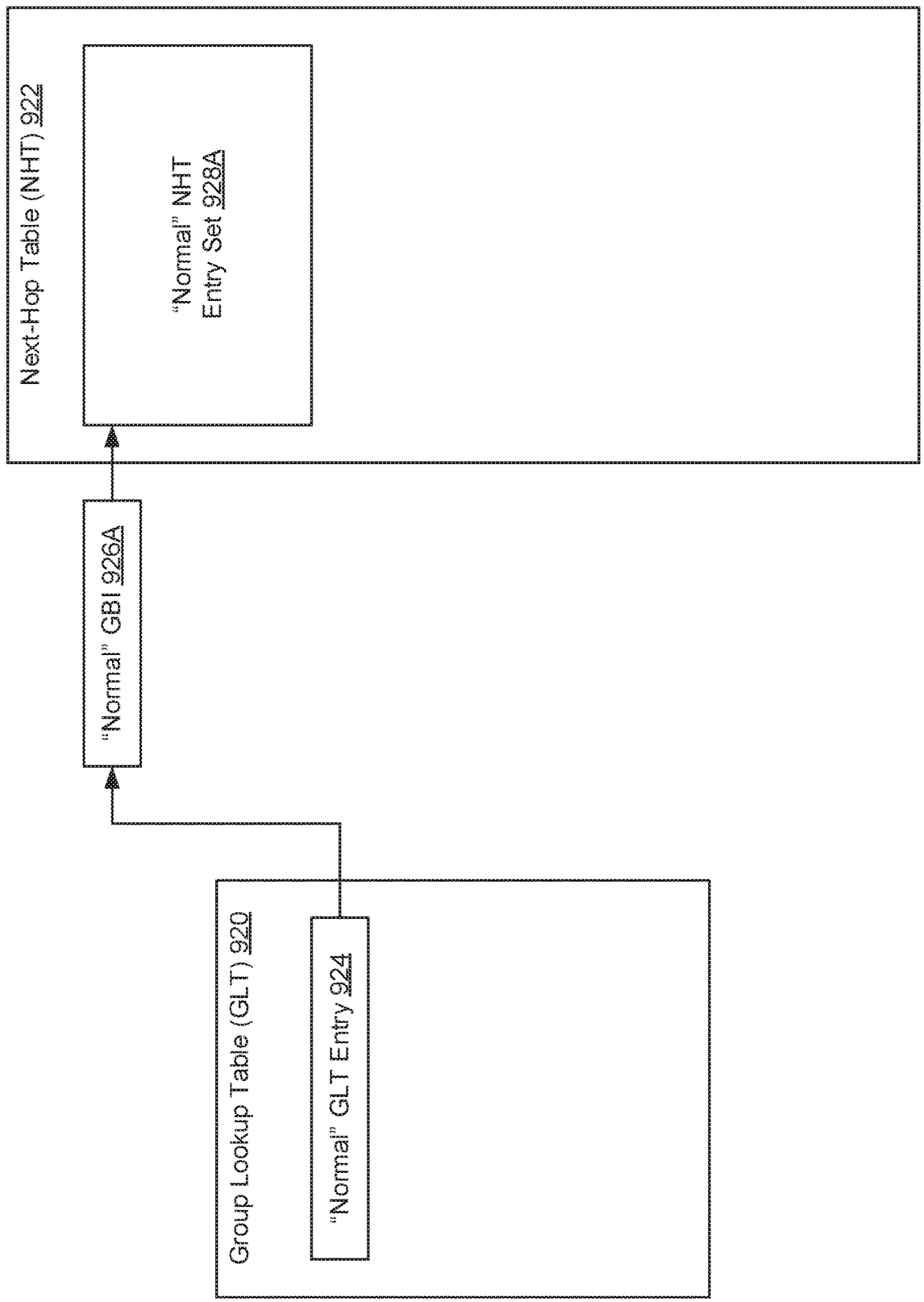
FIGS. 9A-9O show example scenarios in accordance with one or more embodiments of the invention.
Figure 9C:
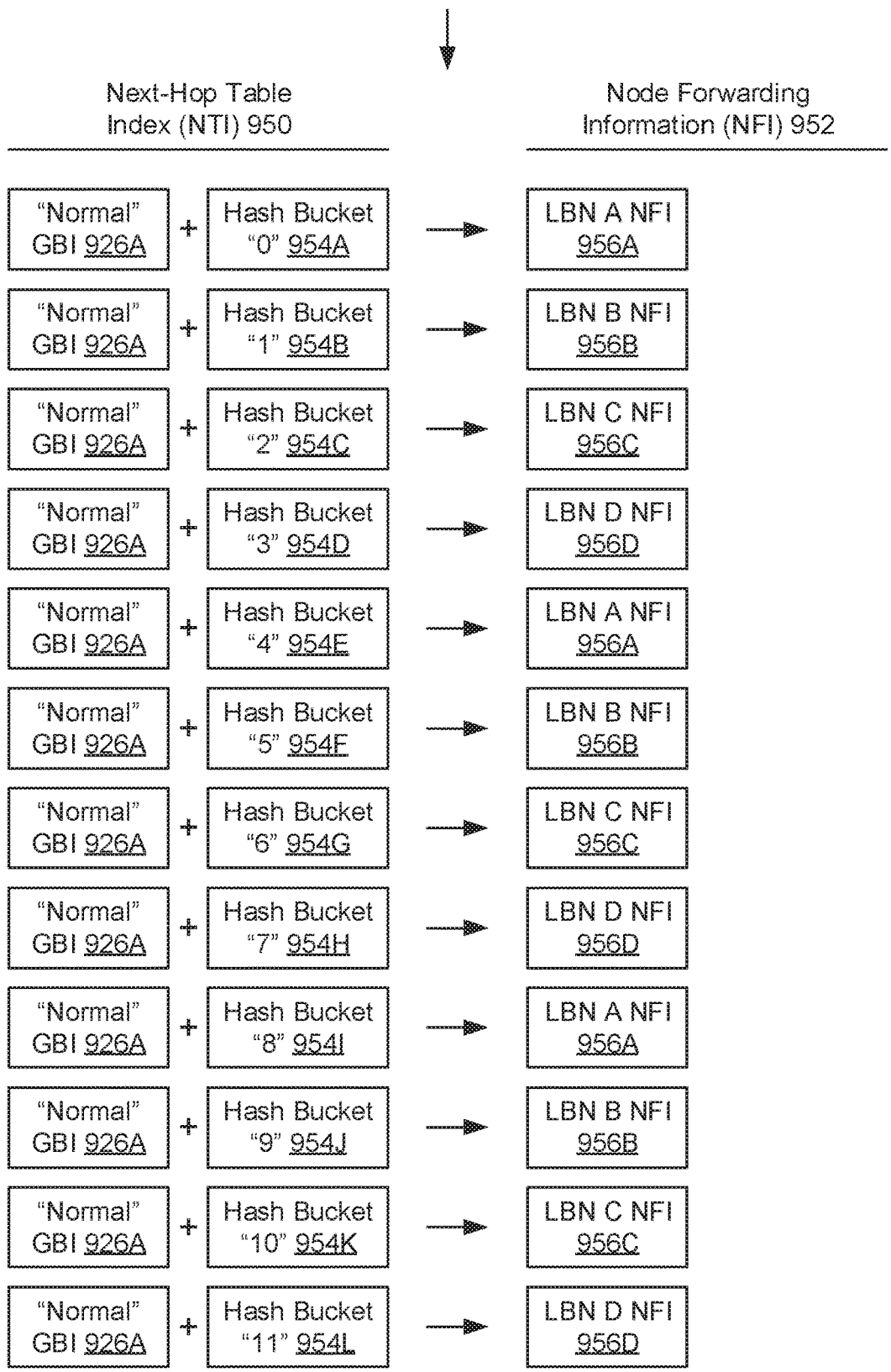
Figure 9E:
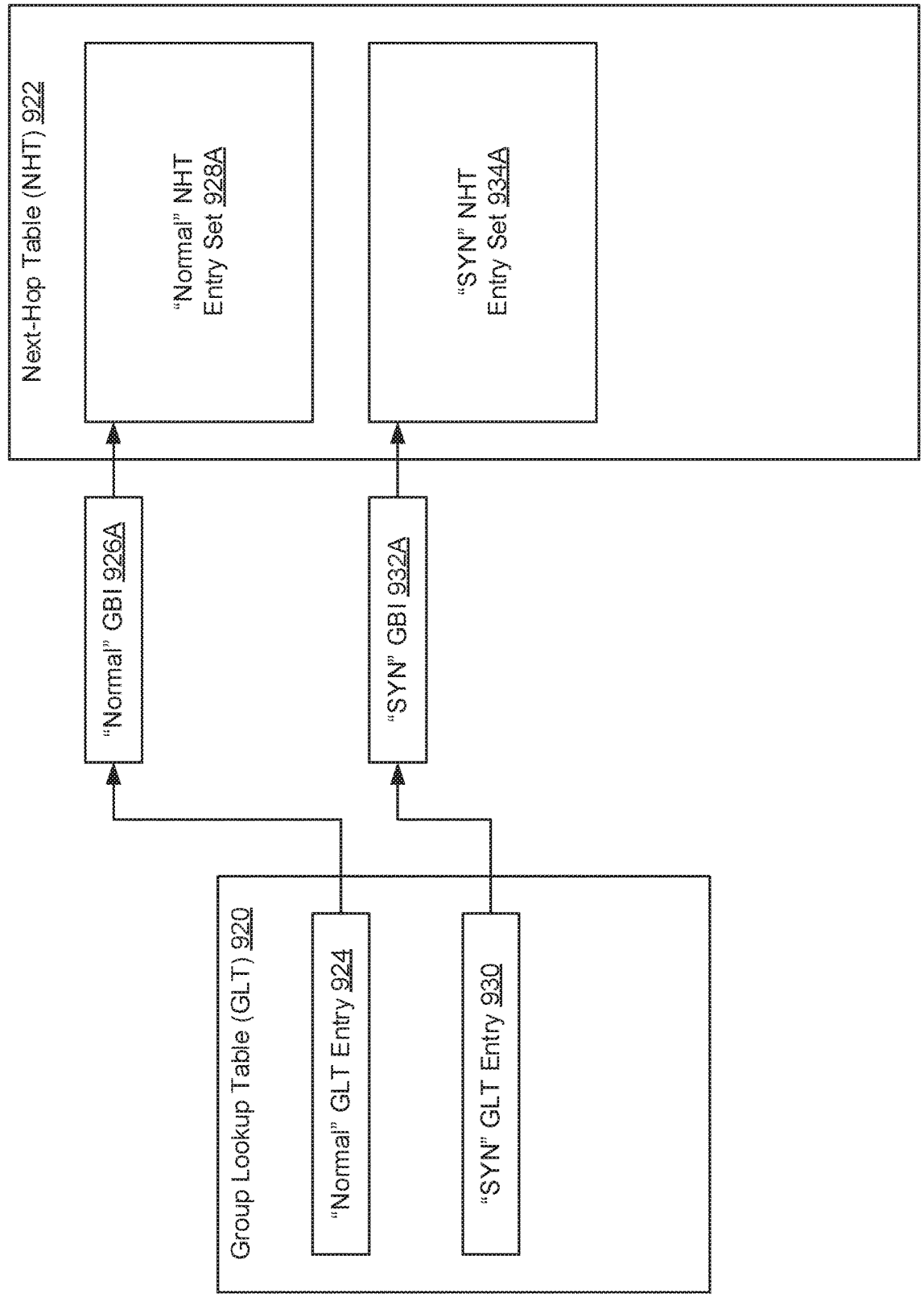
Figure 9F:
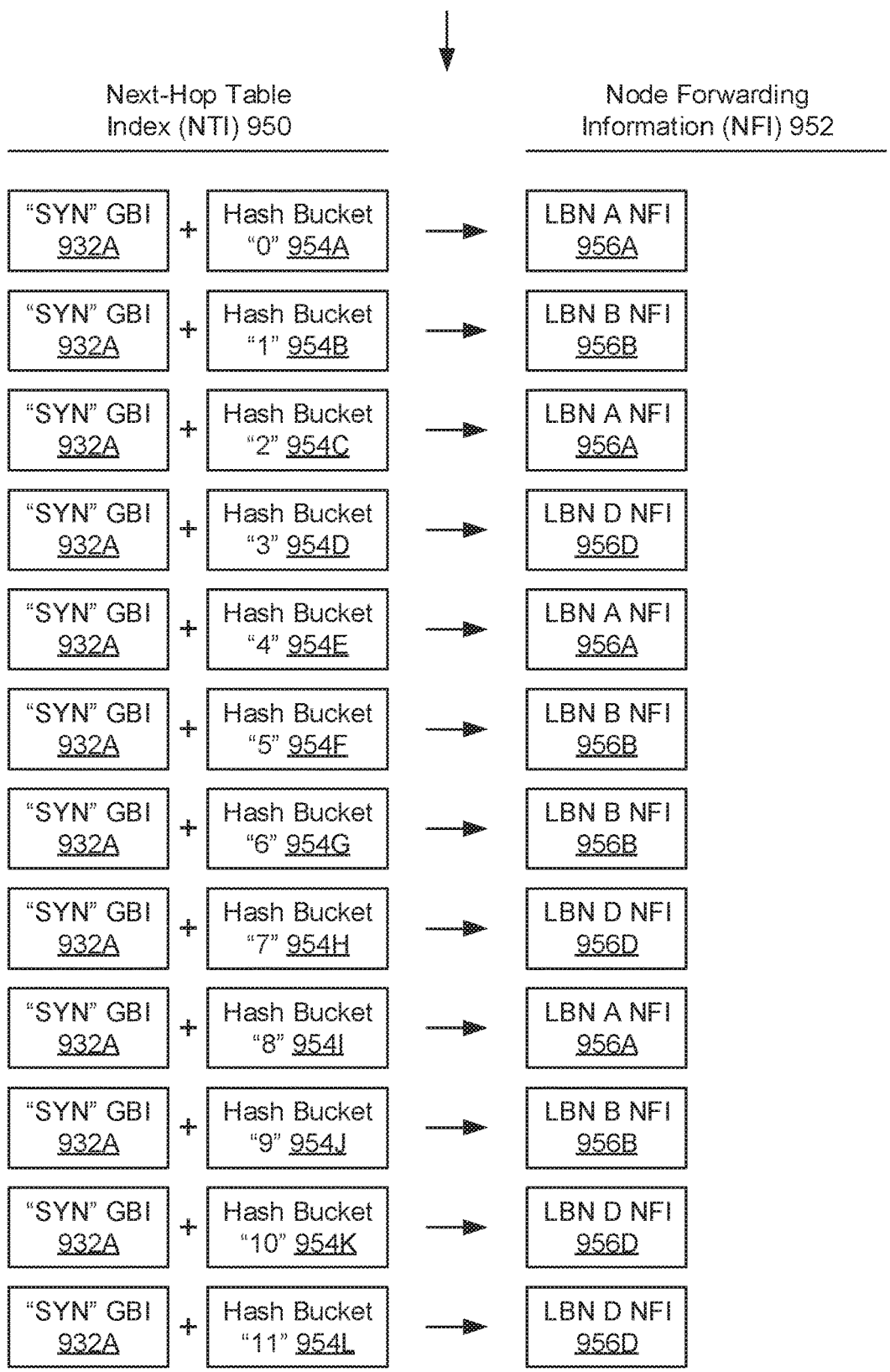
Figure 9G:
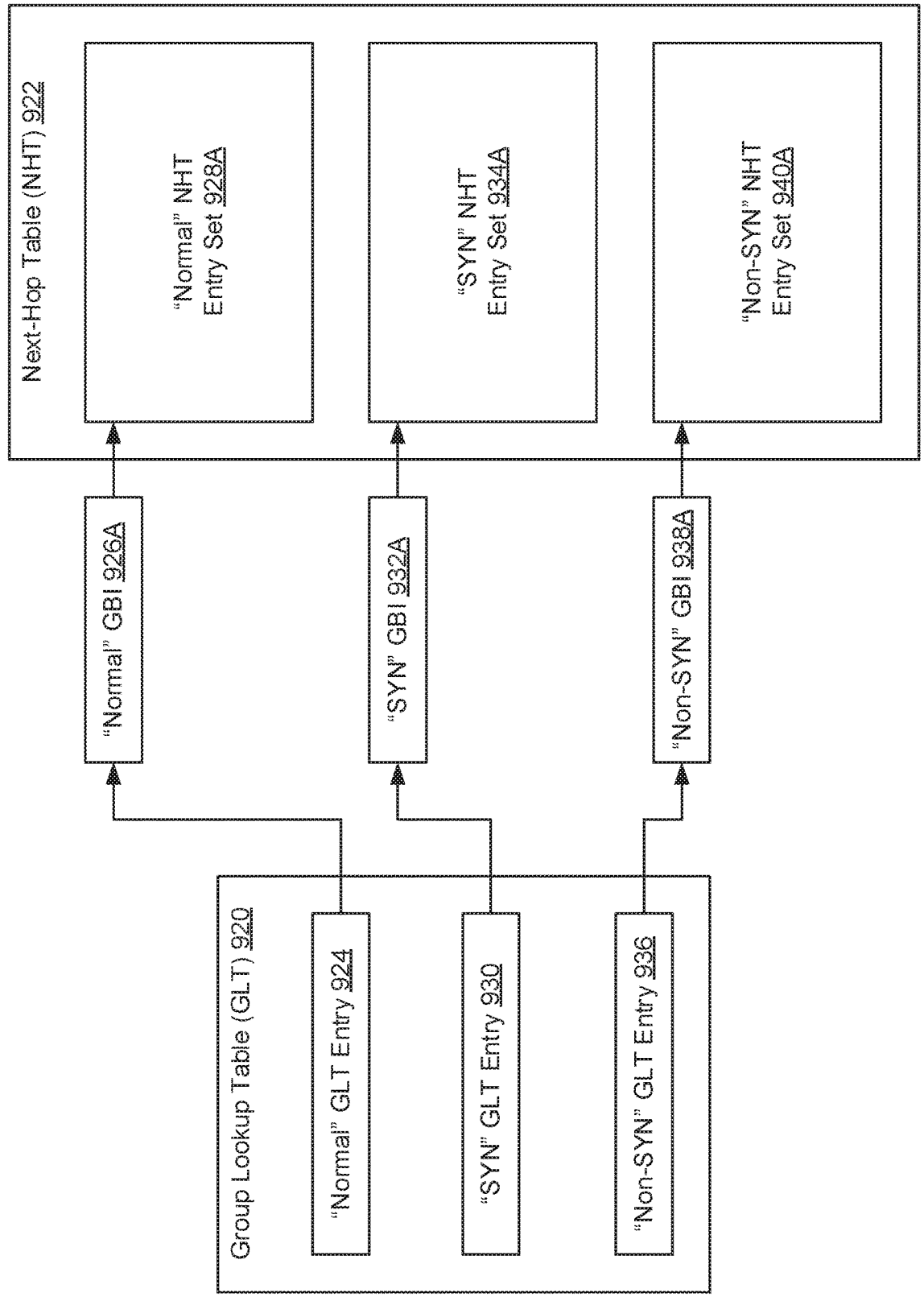
Figure 9H:
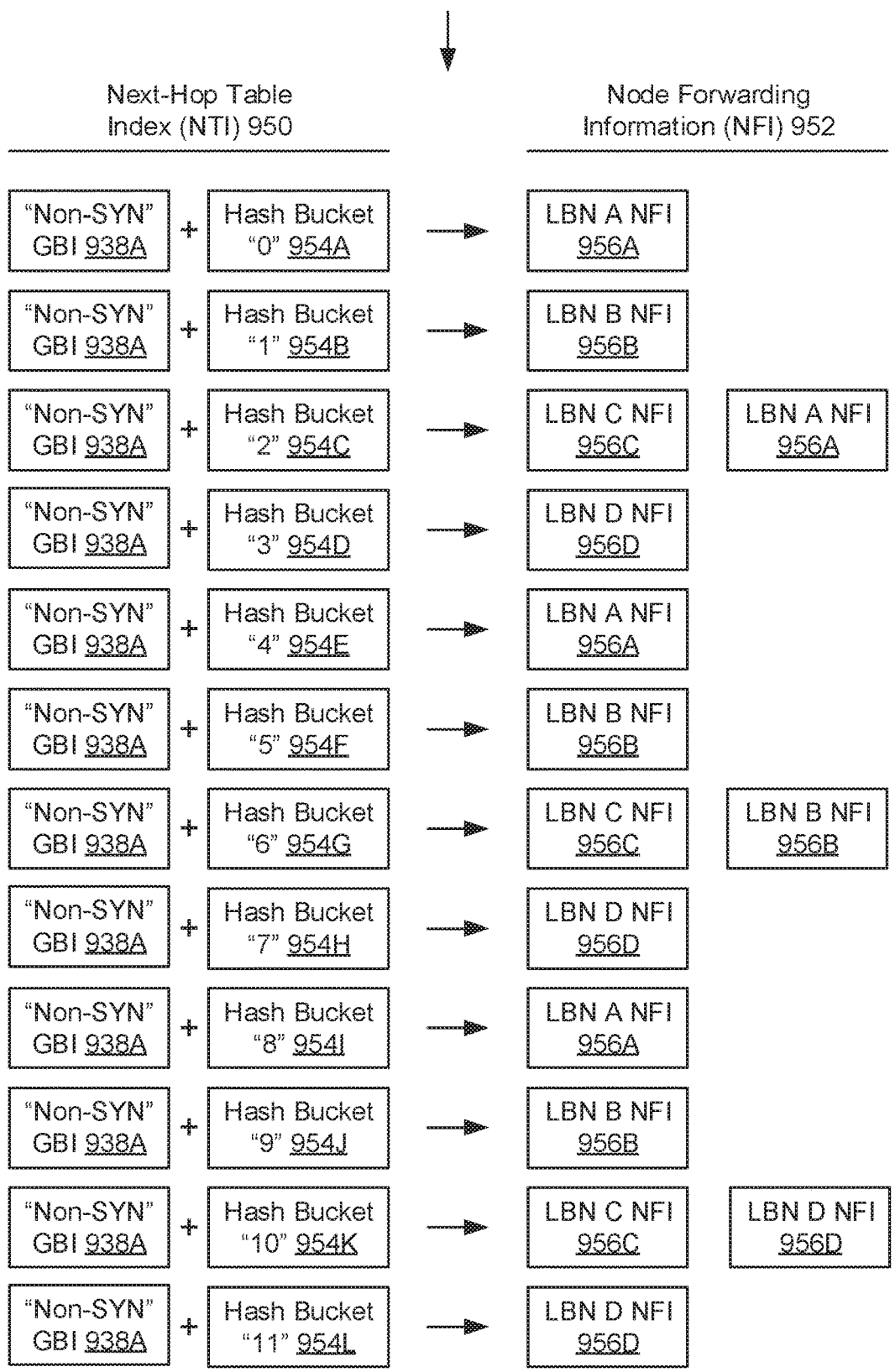
Figure 9I:
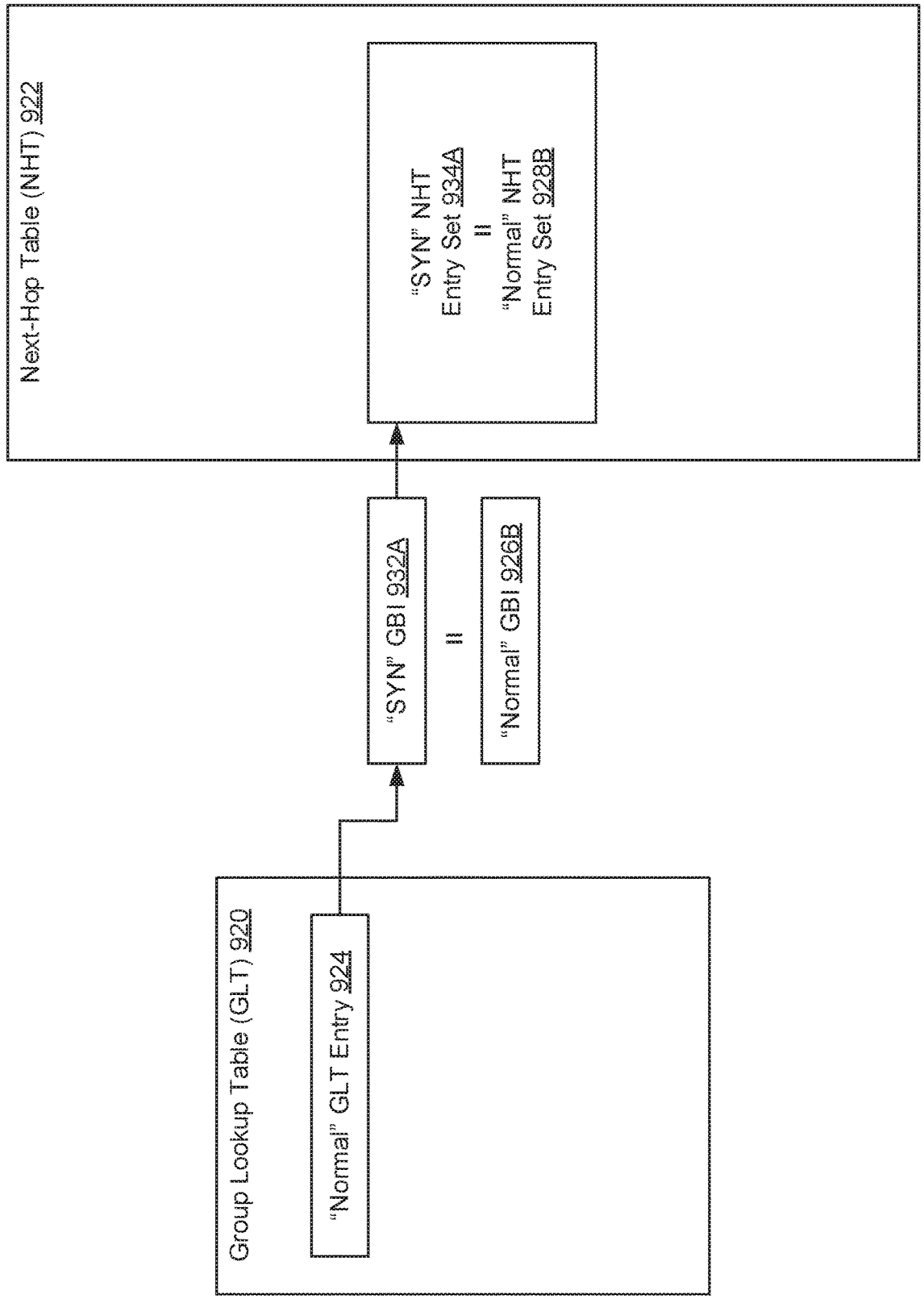
Figure 9J:
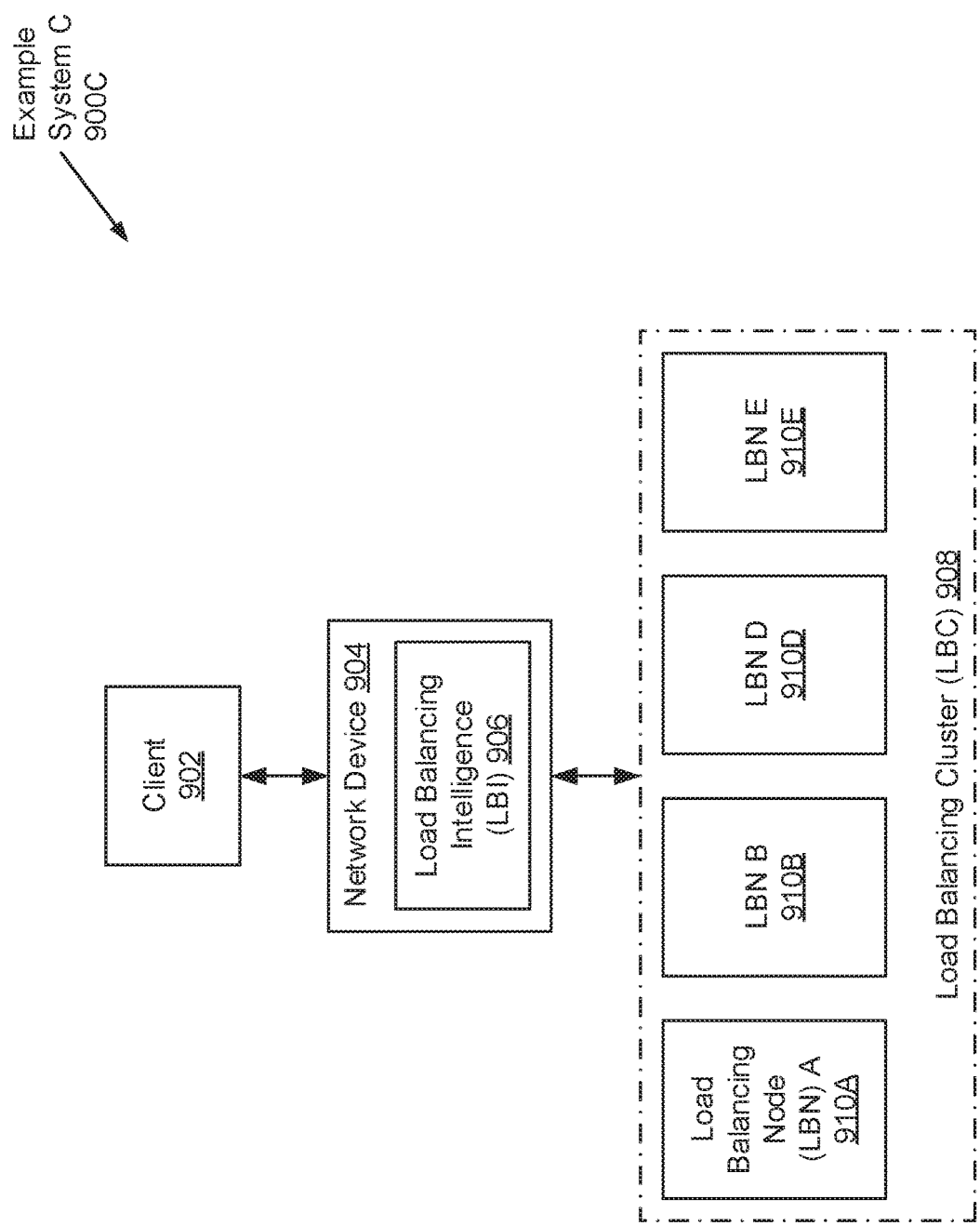
Figure 9K:
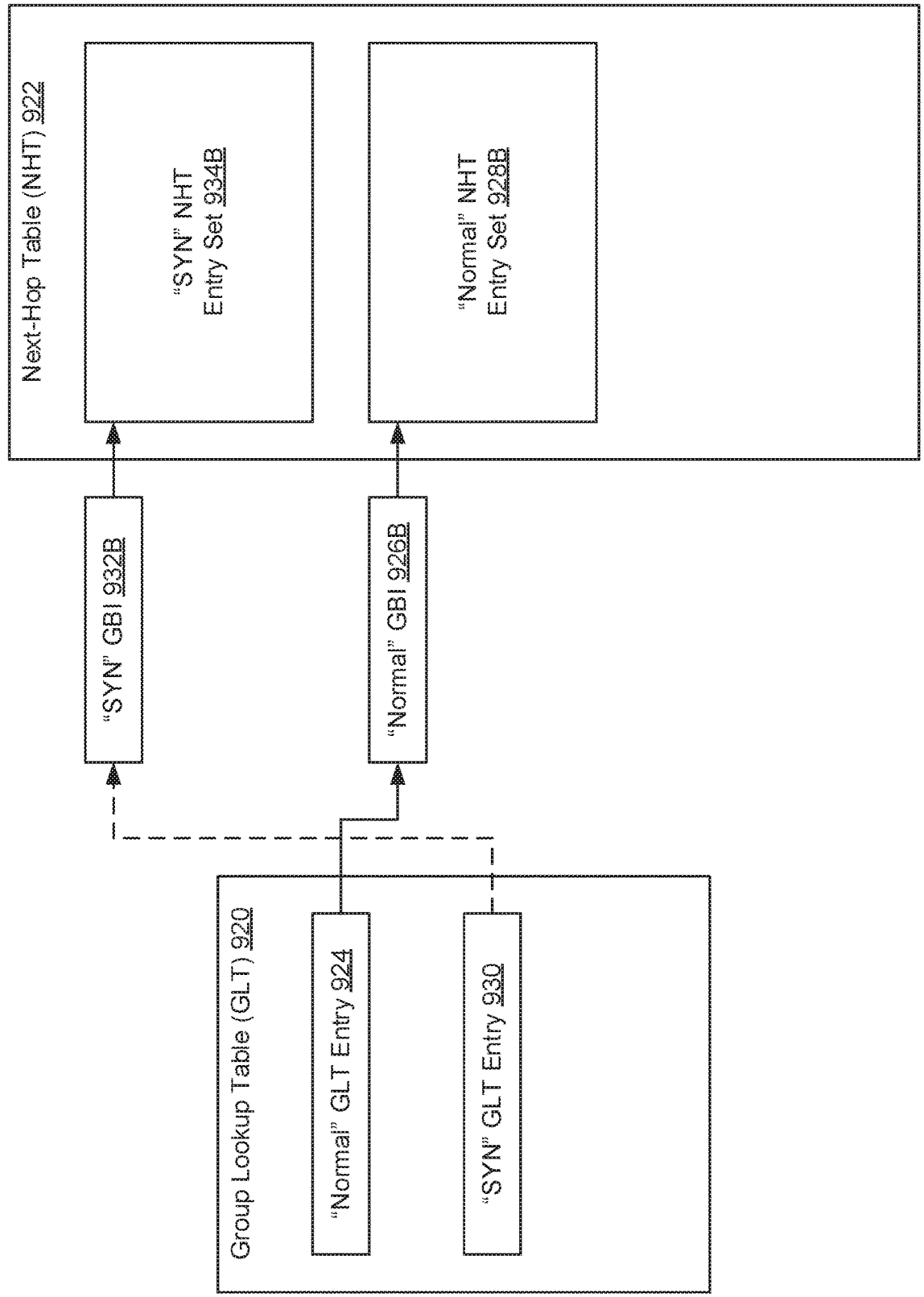
Figure 9L:
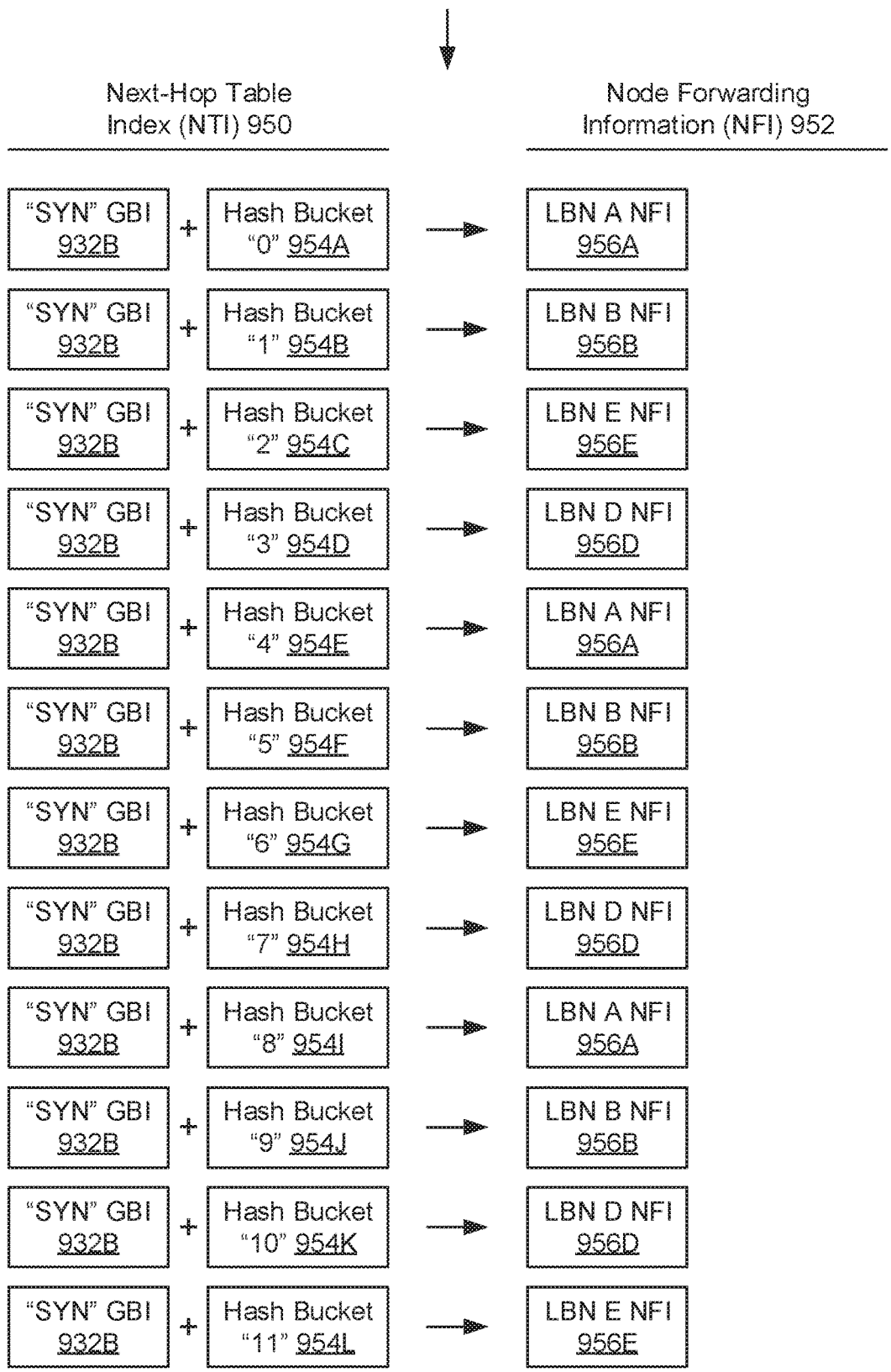
Figure 9M:
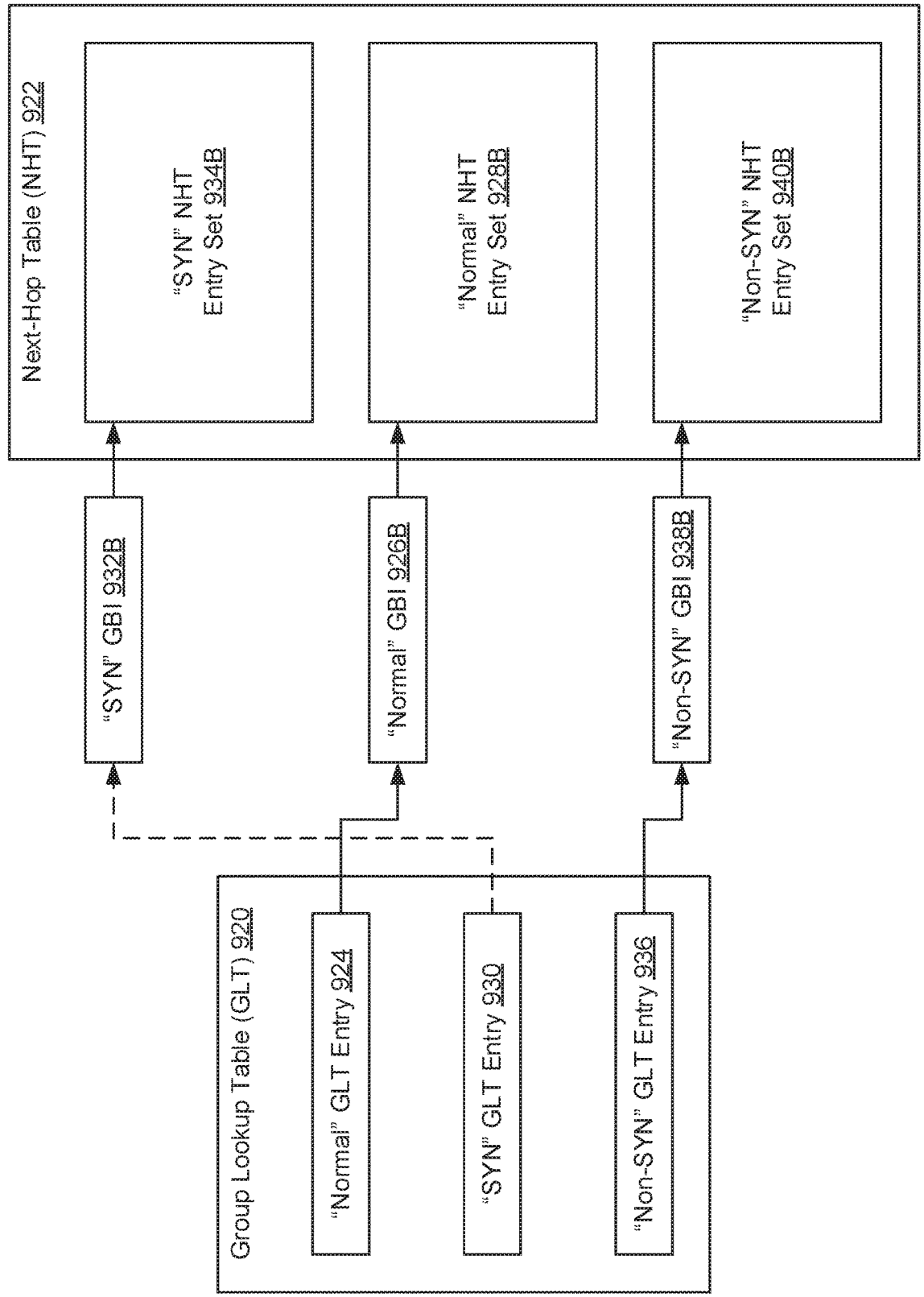
Figure 9N:
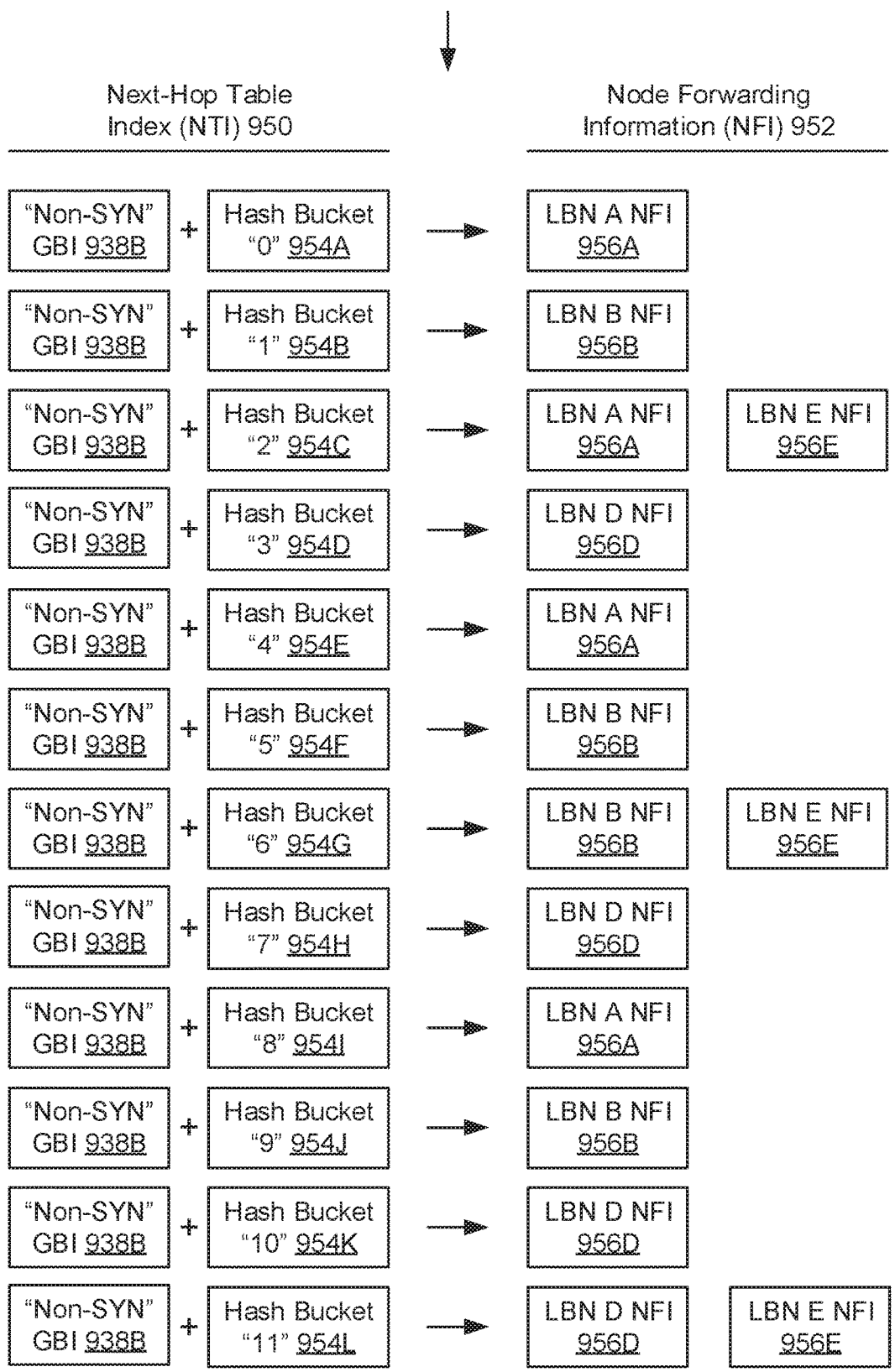
Figure 9O:
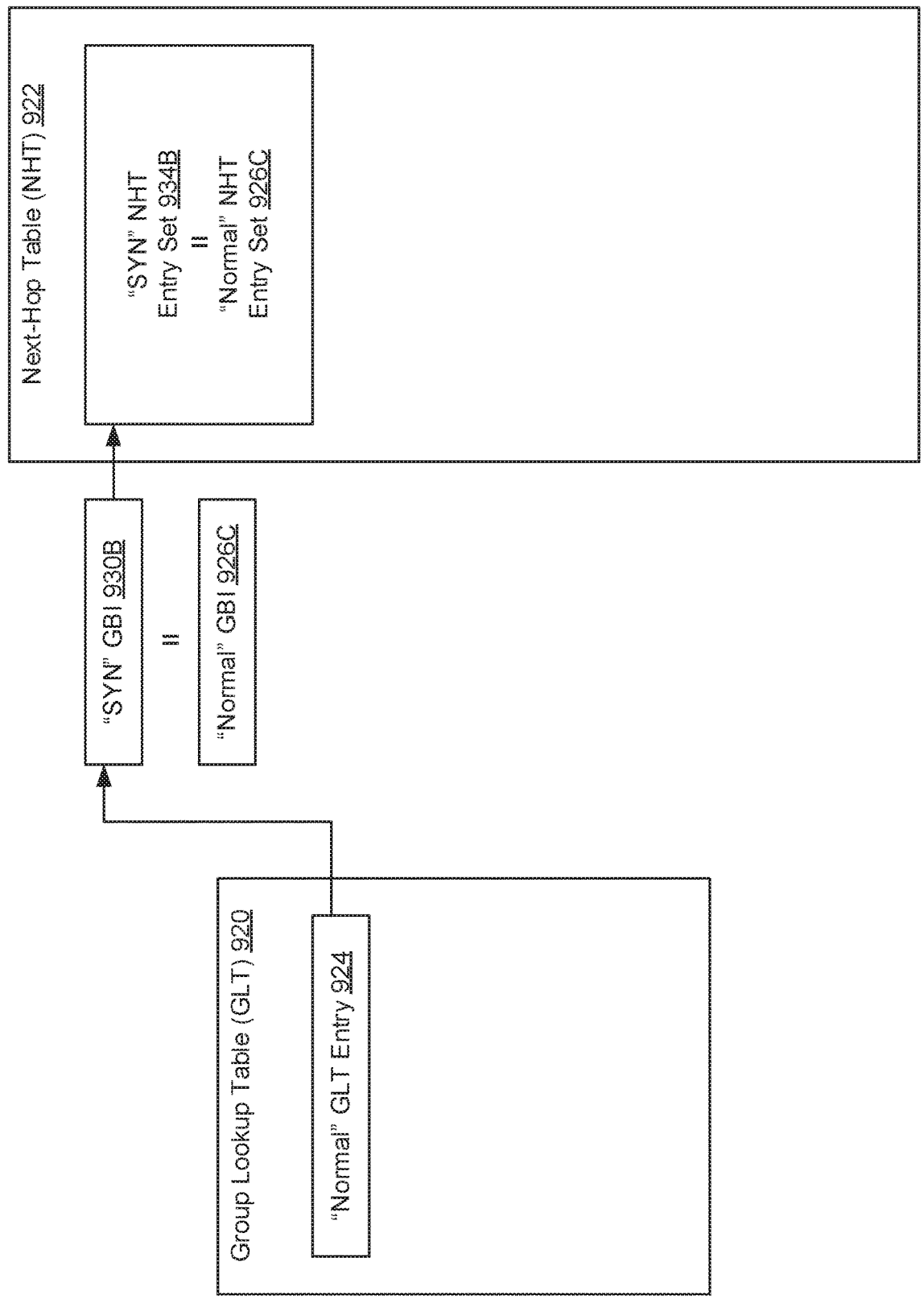

FIGS. 9A-9O show example scenarios in accordance with one or more embodiments of the invention. The following example scenarios, presented in conjunction with components shown in FIGS. 9A-9O, are for explanatory purposes only and not intended to limit the scope of the invention.

Turning to FIG. 9A, an initial example system (900A) configuration is illustrated. The initial example system (900A) configuration includes a client (902) operatively connected to a network device (904), which in turn, is operatively connected to a load balancing cluster (LBC) (908). Further, the network device (904) is hosting a load balancing intelligence (LBI) (906), which is executing thereon and performs embodiments of the invention as described herein. Moreover, the LBC (908) includes four load balancing nodes (LBNs)—i.e., a first LBN (910A), a second LBN (910B), a third LBN (910C), and a fourth LBN (910D).

Turning to FIG. 9B, an initial mapping connecting a group lookup table (GLT) (920) and a next-hop table (NHT) (922) is illustrated. The GLT (920) includes a first GLT entry (924), which is associated with a primary (e.g., "normal") forwarding group. Further, the first GLT entry (924) at least specifies an initial first group base index (GBI) (926A), which references a next-hop table index (NTI) (not shown) for a first (or topmost) NHT entry of an initial first NHT entry set (928A) mapped to the primary forwarding group.

Turning to FIG. 9C, the above-mentioned initial first NHT entry set (928A), mapped to the primary forwarding group, is illustrated. The initial first NHT entry set (928A) includes various successive NHT entries, where each NHT entry specifies a next-hop table index (NTI) (950) and node forwarding information (NFI) (952). Further, the NTI (950) is derived from the initial first GBI (926A) and a hash bucket (954A-954L). The NFI (952), on the other hand, encompasses forwarding information (956A-956D) associated with one of the four existing LBNs (910A-910D) forming the LBC (908).

Example Scenario 1

When a data packet is received from the client (902), at least a portion of header information specified in the data packet is extracted and used to generate a hash key (not shown) by way of a hashing function. The hash key is subsequently processed using a mapping function to obtain a hash bucket (954A-954L)—e.g., hash bucket "2" (954C). A multicast replication status (MRS) is examined and found to be disabled. Accordingly, load balancing (or distribution) operations are transpiring under normal operating conditions. Based on this assessment, the first GLT entry (924), associated with the primary (e.g., "normal") forwarding group, is identified—noting that the primary forwarding group governs data packet forwarding during normal operating conditions. From the first GLT entry (924), the initial first GBI (926A) is retrieved and used, in conjunction with the obtained hash bucket (954C), to derive a NTI (950). A lookup is subsequently performed on the NHT (922) using the derived NTI (950)—i.e., initial first GBI (926A)+hash bucket (954C)—to identify a NHT entry of the initial first NHT entry set (928A). The identified NHT entry specifies forwarding information—e.g., LBN C NFI (956C)—which is retrieved therefrom and used to forward (i.e., unicast) the received data packet from the client (902) to a LBN associated with the retrieved NFI—e.g., the third LBN (910C).

Turning to FIG. 9D, an updated example system (900B) configuration is illustrated. The updated example system (900B) configuration highlights that the third LBN (910C) has become unresponsive. Accordingly, the previously disabled MRS is enabled, thus reflecting that load balancing (or distribution) operations hereinafter are transpiring under abnormal operating conditions—e.g., the graceful removal of the third LBN (910C) from the LBC (908).

Turning to FIG. 9E, an updated mapping connecting the GLT (920) and the NHT (922) is illustrated. From the mapping shown in FIG. 9B, the GLT (920) now further includes a second GLT entry (930), which is associated with a secondary (e.g., "SYN") forwarding group. The second GLT entry (930) at least specifies an initial second GBI (932A), which references a NTI (not shown) for a first (or topmost) NHT entry of an initial second NHT entry set (934A) mapped to the secondary forwarding group.

Turning to FIG. 9F, the above-mentioned initial second NHT entry set (934A), mapped to the secondary forwarding group, is illustrated. The initial second NHT entry set (934A) may be generated following the enabling of the MRS (mentioned above) in accordance with embodiments of the invention (see e.g., FIG. 3). Specifically, generation of the initial second NHT entry set (934A) may entail: (i) duplicating the initial first NHT entry set (928A), mapped to the primary forwarding group, to initialize the initial second NHT entry set (934A) within unused space in the NHT (922); (ii) identifying a subset of NHT entries of the initial second NHT entry set (934A), where each NHT entry of the subset at least specifies forwarding information—e.g., LBN C NFI (956C)—associated with the third LBN (910C); and (iii) replacing the existing NFI (956C) in each NHT entry of the aforementioned subset with forwarding information—e.g., LBN A NFI (956A), LBN B NFI (956B), or LBN D NFI (956D)—associated with one of the remaining responsive/active LBNs (910A, 910B, 910D). Moreover, selection of which remaining LBN NFI to replace the existing NFI (956C) in each identified NHT entry of the subset may have been determined based on a load balancing policy constrained to maintain equal (or near-equal) load balancing.

Turning to FIG. 9G, an updated mapping connecting the GLT (920) and the NHT (922) is illustrated. From the mapping shown in FIG. 9E, the GLT (920) now further includes a third GLT entry (936), which is associated with a tertiary (e.g., "non-SYN") forwarding group. The third GLT entry (936) at least specifies an initial third GBI (938A), which references a NTI (not shown) for a first (or topmost) NHT entry of an initial third NHT entry set (940A) mapped to the tertiary forwarding group.

Turning to FIG. 9H, the above-mentioned initial third NHT entry set (940A), mapped to the tertiary forwarding group, is illustrated. The initial third NHT entry set (940A) may be generated following the enabling of the MRS (mentioned above) in accordance with embodiments of the invention (see e.g., FIG. 3). Specifically, generation of the initial third NHT entry set (940A) may entail: (i) duplicating the initial first NHT entry set (928A), mapped to the primary forwarding group, to initialize the initial third NHT entry set (940A) within unused space in the NHT (922); (ii) identifying a subset of NHT entries of the initial third NHT entry set (940A), where each NHT entry of the subset at least specifies forwarding information—e.g., LBN C NFI (956C)—associated with the third LBN (910C); and (iii) supplementing the existing NFI (956C) in each NHT entry of the aforementioned subset with forwarding information—e.g., LBN A NFI (956A), LBN B NFI (956B), or LBN D NFI (956D)—associated with one of the remaining responsive/active LBNs (910A, 910B, 910D). Moreover, selection of which remaining LBN NFI to supplement the existing NFI (956C) in each identified NHT entry of the subset may have been determined based on a load balancing policy constrained to maintain equal (or near-equal) load balancing.

Example Scenario 2A

When a data packet is received from the client (902), at least a portion of header information specified in the data packet is extracted and used to generate a hash key (not shown) by way of a hashing function. The hash key is subsequently processed using a mapping function to obtain a hash bucket (954A-954L)—e.g., hash bucket "2" (954C). A multicast replication status (MRS) is examined and found to be enabled. Accordingly, load balancing (or distribution) operations are transpiring under abnormal operating conditions—e.g., the graceful removal of the third LBN (910C) from the LBC (908). Based on this assessment, the received data packet is further examined to identify the data packet as a synchronize (SYN) data packet. Based on the identification of the data packet as a SYN data packet, the second GLT entry (930), associated with the secondary (e.g., "SYN") forwarding group, is identified. From the second GLT entry (930), the initial second GBI (932A) is retrieved and used, in conjunction with the obtained hash bucket (954C), to derive a NTI (950). A lookup is subsequently performed on the NHT (922) using the derived NTI (950)—i.e., initial second GBI (932A)+hash bucket (954C)—to identify a NHT entry of the initial second NHT entry set (934A). The identified NHT entry specifies forwarding information—e.g., LBN A NFI (956A)—which is retrieved therefrom and used to forward (i.e., unicast) the received data packet from the client (902) to a LBN associated with the retrieved NFI—e.g., the first LBN (910A).

Example Scenario 2B

When a data packet is received from the client (902), at least a portion of header information specified in the data packet is extracted and used to generate a hash key (not shown) by way of a hashing function. The hash key is subsequently processed using a mapping function to obtain a hash bucket (954A-954L)—e.g., hash bucket "2" (954C). A multicast replication status (MRS) is examined and found to be enabled. Accordingly, load balancing (or distribution) operations are transpiring under abnormal operating conditions—e.g., the graceful removal of the third LBN (910C) from the LBC (908). Based on this assessment, the received data packet is further examined to identify the data packet as a non-synchronize (non-SYN) data packet. Based on the identification of the data packet as a non-SYN data packet, the third GLT entry (936), associated with the tertiary (e.g., "non-SYN") forwarding group, is identified. From the third GLT entry (936), the initial third GBI (938A) is retrieved and used, in conjunction with the obtained hash bucket (954C), to derive a NTI (950). A lookup is subsequently performed on the NHT (922) using the derived NTI (950)—i.e., initial third GBI (938A)+hash bucket (954C)—to identify a NHT entry of the initial third NHT entry set (940A). The identified NHT entry specifies forwarding information—e.g., LBN C NFI (956C) and LBN A NFI (956A)—which is retrieved therefrom and used to forward (i.e., multicast) the received data packet from the client (902) to the LBNs associated with the retrieved NFIs—e.g., the third LBN (910C) and the first LBN (910A), respectively.

Turning to FIG. 9I, a remapping of the initial second NHT entry set (934A) is illustrated. Specifically, the initial second NHT entry set (934A), which had originally been mapped to the secondary forwarding group, now maps to the primary forwarding group. Accordingly, the initial second NHT entry set (934A) becomes a new first NHT entry set (928B). Similarly, the initial second GBI (932A), which had referenced the initial second NHT entry set (934A), becomes a new first GBI (926B), which references the new first NHT entry set (928B). Further, remapping of the initial second NHT entry set (934A) may transpire following the termination of abnormal operating conditions—e.g., the graceful removal of the third LBN (910C) from the LBC (908). Termination of the abnormal operating conditions may have been triggered upon tracked termination-pertinent information (TPI) satisfying replication termination criteria (RTC) (see e.g., FIG. 6). In terminating abnormal operating conditions, the previously enabled MRS is disabled, thus reflecting that load balancing (or distribution) operations hereinafter are again transpiring under normal operating conditions. Following the remapping of the initial second NHT entry set (934A), the initial first and third NHT entry sets (not shown), as well as the second and third GLT entries (not shown), may be deleted.

Turning to FIG. 9J, an updated example system (900C) configuration is illustrated. The updated example system (900C) configuration highlights that a fifth LBN (910E) has been introduced to the LBC (908). Accordingly, the previously disabled MRS is enabled, thus reflecting that load balancing (or distribution) operations hereinafter are transpiring under abnormal operating conditions—e.g., the hitless addition of the fifth LBN (910E) to the LBC (908).

Turning to FIG. 9K, an updated mapping connecting the GLT (920) and the NHT (922) is illustrated. From the mapping shown in FIG. 9I, the GLT (920) now further includes a second GLT entry (930), which is associated with a secondary (e.g., "SYN") forwarding group. The secondary GLT entry (930) at least specifies a new second GBI (932B), which references a NTI (not shown) for a first (or topmost) NHT entry of a new second NHT entry set (934B) mapped to the secondary forwarding group.

Turning to FIG. 9L, the above-mentioned new second NHT entry set (934B), mapped to the secondary forwarding group, is illustrated. The new second NHT entry set (934B) may be generated following the enabling of the MRS (mentioned above) in accordance with embodiments of the invention (see e.g., FIG. 4). Specifically, generation of the new second NHT entry set (934B) may entail: (i) duplicating the new first NHT entry set (928B), mapped to the primary forwarding group, to initialize the new second NHT entry set (934B) within unused space in the NHT (922); (ii) identifying a subset of NHT entries of the new second NHT entry set (934B), where each NHT entry of the subset is selected based on a load distribution policy; and (iii) replacing the existing NFI (956A, 956B, or 956D) in each identified NHT entry of the aforementioned subset with forwarding information—e.g., LBN E NFI (956E)—associated with the fifth (new) LBN (910E). Moreover, the load distribution policy may be constrained to maintain equal (or near-equal) load balancing. Subsequently, an equal (or near-equal) quantity of NHT entries directing data packets to each of the previously existing LBNs (910A, 910B, 910D) are identified into the subset of NHT entries of the new second NHT entry set (934B).

Turning to FIG. 9M, an updated mapping connecting the GLT (920) and the NHT (922) is illustrated. From the mapping shown in FIG. 9K, the GLT (920) now further includes a third GLT entry (936), which is associated with a tertiary (e.g., "non-SYN") forwarding group. The tertiary GLT entry (936) at least specifies a new third GBI (938B), which references a NTI (not shown) for a first (or topmost) NHT entry of a new third NHT entry set (940B) mapped to the tertiary forwarding group.

Turning to FIG. 9N, the above-mentioned new third NHT entry set (940B), mapped to the tertiary forwarding group, is illustrated. The new third NHT entry set (940B) may be generated following the enabling of the MRS (mentioned above) in accordance with embodiments of the invention (see e.g., FIG. 4). Specifically, generation of the new third NHT entry set (940B) may entail: (i) duplicating the new first NHT entry set (928B), mapped to the primary forwarding group, to initialize the new third NHT entry set (940B) within unused space in the NHT (922); (ii) identifying a subset of NHT entries of the new third NHT entry set (940B), where each NHT entry of the subset is selected based on a load distribution policy; and (iii) supplementing the existing NFI (956A, 956B, or 956D) in each identified NHT entry of the aforementioned subset with forwarding information—e.g., LBN E NFI (956E)—associated with the fifth (new) LBN (910E). Moreover, the load distribution policy may be constrained to maintain equal (or near-equal) load balancing. Subsequently, an equal (or near-equal) quantity of NHT entries directing data packets to each of the previously existing LBNs (910A, 910B, 910D) are identified into the subset of NHT entries of the new third NHT entry set (940B).

Example Scenario 3A

When a data packet is received from the client (902), at least a portion of header information specified in the data packet is extracted and used to generate a hash key (not shown) by way of a hashing function. The hash key is subsequently processed using a mapping function to obtain a hash bucket (954A-954L)—e.g., hash bucket "2" (954C). A multicast replication status (MRS) is examined and found to be enabled. Accordingly, load balancing (or distribution) operations are transpiring under abnormal operating conditions—e.g., the hitless addition of the fifth LBN (910E) to the LBC (908). Based on this assessment, the received data packet is further examined to identify the data packet as a synchronize (SYN) data packet. Based on the identification of the data packet as a SYN data packet, the second GLT entry (930), associated with the secondary (e.g., "SYN") forwarding group, is identified. From the second GLT entry (930), the new second GBI (932B) is retrieved and used, in conjunction with the obtained hash bucket (954C), to derive a NTI (950). A lookup is subsequently performed on the NHT (922) using the derived NTI (950)—i.e., new second GBI (932B)+hash bucket (954C)—to identify a NHT entry of the new second NHT entry set (934B). The identified NHT entry specifies forwarding information—e.g., LBN E NFI (956E)—which is retrieved therefrom and used to forward (i.e., unicast) the received data packet from the client (902) to a LBN associated with the retrieved NFI—e.g., the fifth (new) LBN (910E).

Example Scenario 3B

When a data packet is received from the client (902), at least a portion of header information specified in the data packet is extracted and used to generate a hash key (not shown) by way of a hashing function. The hash key is subsequently processed using a mapping function to obtain a hash bucket (954A-954L)—e.g., hash bucket "2" (954C). A multicast replication status (MRS) is examined and found to be enabled. Accordingly, load balancing (or distribution) operations are transpiring under abnormal operating conditions—e.g., the hitless addition of the fifth LBN (910E) to the LBC (908). Based on this assessment, the received data packet is further examined to identify the data packet as a non-synchronize (non-SYN) data packet. Based on the identification of the data packet as a non-SYN data packet, the third GLT entry (936), associated with the tertiary (e.g., "non-SYN") forwarding group, is identified. From the third GLT entry (936), the new third GBI (938B) is retrieved and used, in conjunction with the obtained hash bucket (954C), to derive a NTI (950). A lookup is subsequently performed on the NHT (922) using the derived NTI (950)—i.e., new third GBI (938B)+hash bucket (954C)—to identify a NHT entry of the new third NHT entry set (940B). The identified NHT entry specifies forwarding information—e.g., LBN A NFI (956A) and LBN E NFI (956E)—which is retrieved therefrom and used to forward (i.e., multicast) the received data packet from the client (902) to the LBNs associated with the retrieved NFIs—e.g., the first LBN (910A) and the fifth (new) LBN (910E), respectively.

Turning to FIG. 9O, a remapping of the new second NHT entry set (934B) is illustrated. Specifically, the new second NHT entry set (934B), which had originally been mapped to the secondary forwarding group, now maps to the primary forwarding group. Accordingly, the new second NHT entry set (934B) becomes a newest first NHT entry set (928C). Similarly, the new second GBI (932B), which had referenced the new second NHT entry set (934B), becomes a newest first GBI (926C), which references the newest first NHT entry set (928C). Further, remapping of the new second NHT entry set (934B) may transpire following the termination of abnormal operating conditions—e.g., the hitless addition of the fifth LBN (910E) to the LBC (908). Termination of the abnormal operating conditions may have been triggered upon tracked termination-pertinent information (TPI) satisfying replication termination criteria (RTC) (see e.g., FIG. 6). In terminating abnormal operating conditions, the previously enabled MRS is disabled, thus reflecting that load balancing (or distribution) operations hereinafter are again transpiring under normal operating conditions. Following the remapping of the new second NHT entry set (934B), the new first and third NHT entry sets (not shown), as well as the second and third GLT entries (not shown), may be deleted.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for forwarding data packets, comprising:
receiving, from a client, a first data packet comprising first header information;
generating a first hash key using at least a portion of the first header information and a hashing function;
obtaining a first hash bucket using the first hash key and a mapping function;
making a first determination that a multicast replication status (MRS) is enabled;
based on the first determination:
making a second determination that the first data packet is a non-synchronize (non-SYN) data packet;
identifying, based on the second determination, a first group lookup table (GLT) entry associated with a tertiary forwarding group;
retrieving a first group base index (GBI) from the first GLT entry;
deriving a first next-hop table index (NTI) using the first GBI and the first hash bucket;
performing a first lookup on a next-hop table (NHT) using the first NTI, to obtain a first node forwarding information (NFI) and a second NFI; and
multicasting the first data packet to a first load balancing node (LBN) using the first NFI and a second LBN using the second NFI.

2. The method of claim 1, wherein the MRS indicates a state of a selective multicast replication policy, wherein when the MRS is enabled, the selective multicast replication policy overrides a normal data packet forwarding protocol based on detecting an abnormal operating condition.

3. The method of claim 2, wherein the normal data packet forwarding protocol employs a primary forwarding group, wherein the tertiary forwarding group maps to a first NHT entry set that is a variation of a second NHT entry set mapped to the primary forwarding group, wherein the first NHT entry set comprises a subset of different NHT entries that is not present in the second NHT entry set.

4. The method of claim 3, wherein the abnormal operating condition is a non-disruptive removal of the first LBN from a load balancing cluster (LBC).

5. The method of claim 4, further comprising:
generating, prior to receiving the first data packet, the first NHT entry set by:
duplicating the second NHT entry set to initialize the first NHT entry set in unused space in the NHT;
identifying the subset of different NHT entries in the first NHT entry set, wherein a node network identifier (NNI) for the first LBN matches at least a portion of existing NFI included in each different NHT entry of the subset of different NHT entries; and
supplementing the existing NFI in each different NHT entry of the subset of different NHT entries with new NFI based on a load distribution policy.

6. The method of claim 5, wherein the new NFI is the second NFI associated with the second LBN or other NFI associated with one of at least one other available LBN forming the LBC, wherein the load distribution policy selects the new NFI to supplement the existing NFI in each different NHT entry of the subset of different NHT entries while maintaining equal load balancing across the second LBN and the at least one other available LBN.

7. The method of claim 3, wherein the abnormal operating condition is a non-disruptive addition of the first LBN to a load balancing cluster (LBC).

8. The method of claim 7, further comprising:
generating, prior to receiving the first data packet, the first NHT entry set by:
duplicating the second NHT entry set to initialize the first NHT entry set in unused space in the NHT;
identifying the subset of different NHT entries in the first NHT entry set based on a load distribution policy; and
supplementing existing NFI included in each different NHT entry of the subset of different NHT entries with the first NFI associated with the first LBN.

9. The method of claim 8, wherein the load distribution policy selects the subset of different NHT entries while maintaining equal load balancing across a set of available LBNs forming the LBC, wherein the set of available LBNs comprises the first LBN and the second LBN.

10. The method of claim 1, wherein the tertiary forwarding group is an equal cost multipath (ECMP) group.

11. The method of claim 1, wherein the first NFI comprises a media access control (MAC) address associated with the first LBN and a network interface identifier associated with a network interface on a network device or a third LBN, wherein the network interface operatively connects to the first LBN.

12. The method of claim 11, wherein the first NFI further comprises an Internet Protocol (IP) address associated with the first LBN.

13. The method of claim 1, further comprising:
receiving, from the client, a second data packet comprising second header information;
generating a second hash key using at least a portion of the second header information and the hashing function;
obtaining a second hash bucket using the second hash key and the mapping function;
making a third determination that the MRS is enabled;
based on the third determination:
making a fourth determination that the second data packet is a synchronize (SYN) data packet;
identifying, based on the fourth determination, a second GLT entry associated with a secondary forwarding group;
retrieving a second GBI from the second GLT entry;
deriving a second NTI using the second GBI and the second hash bucket;
performing a second lookup on the NHT using the second NTI, to obtain a third NFI; and
unicasting the second data packet to a third LBN using the third NFI.

14. The method of claim 13, further comprising:
when the first LBN is undergoing a non-disruptive removal from a load balancing cluster (LBC):
generating, prior to receiving the first data packet, a first NHT entry set mapped to the secondary forwarding group by:
duplicating a second NHT entry set, mapped to a primary forwarding group, to initialize the first NHT entry set in unused space in the NHT;
identifying a subset of NHT entries in the first NHT entry set, wherein a node network identifier (NNI) for the first LBN matches at least a portion of existing NFI included in each NHT entry of the subset of NHT entries; and
replacing the existing NFI in each NHT entry of the subset of NHT entries with new NFI based on a load distribution policy.

15. The method of claim 13, further comprising:
when the first LBN is undergoing a non-disruptive addition to a load balancing cluster (LBC):
generating, prior to receiving the first data packet, a first NHT entry set mapped to the secondary forwarding group by:
duplicating a second NHT entry set, mapped to a primary forwarding group, to initialize the first NHT entry set in unused space in the NHT;
identifying a subset of NHT entries in the first NHT entry set based on a load distribution policy; and
replacing existing NFI in each NHT entry of the subset of NHT entries with the first NFI associated with the first LBN.

16. The method of claim 1, further comprising:
receiving, from the client, a second data packet comprising second header information;
generating a second hash key using at least a portion of the second header information and the hashing function;
obtaining a second hash bucket using the second hash key and the mapping function;
making a third determination that the MRS is disabled;
based on the third determination:
identifying a second GLT entry associated with a primary forwarding group;
retrieving a second GBI from the second GLT entry;
deriving a second NTI using the second GBI and the second hash bucket;
performing a second lookup on the NHT using the second NTI, to obtain a third NFI; and
unicasting the second data packet to a third LBN using the third NFI.

17. A system, comprising:
a client;
a load balancing cluster (LBC) operatively connected to the client, and comprising a plurality of load balancing nodes (LBNs); and
a computer processor operatively connected to the client and the LBC, and whereon a load balancing intelligence (LBI) is executing,
wherein the LBI is programmed to:
receive, from the client, a data packet comprising header information;
generate a hash key using at least a portion of the header information and a hashing function;
obtain a hash bucket using the hash key and a mapping function;
make a first determination that a multicast replication status (MRS) is enabled;
based on the first determination:
make a second determination that the data packet is a non-synchronize (non-SYN) data packet;
identify, based on the second determination, a group lookup table (GLT) entry associated with a tertiary forwarding group;
retrieve a group base index (GBI) from the GLT entry;
derive a next-hop table index (NTI) using the GBI and the hash bucket;
perform a lookup on a next-hop table (NHT) using the NTI, to obtain a first node forwarding information (NFI) and a second NFI; and
multicast the data packet to a first LBN of the plurality of LBNs using the first NFI and a second LBN of the plurality of LBNs using the second NFI.

18. The system of claim 17, further comprising:
a network device interposed between and operatively connected to the client and the LBC,
wherein the computer processor and the LBI reside on the network device,
wherein the network device is a switch, a router, or a multilayer switch.

19. The system of claim 17, wherein the plurality of LBNs comprises a third LBN, wherein the computer processor and the LBI reside on the third LBN.

20. A non-transitory computer readable medium (CRM) comprising computer readable program code, which when executed by a computer processor, enables the computer processor to:
receive, from a client, a data packet comprising header information;
generate a hash key using at least a portion of the header information and a hashing function;
obtain a hash bucket using the hash key and a mapping function;
make a first determination that a multicast replication status (MRS) is enabled;

based on the first determination:
- make a second determination that the data packet is a non-synchronize (non-SYN) data packet;
- identify, based on the second determination, a group lookup table (GLT) entry associated with a tertiary forwarding group;
- retrieve a group base index (GBI) from the GLT entry;
- derive a next-hop table index (NTI) using the GBI and the hash bucket;
- perform a lookup on a next-hop table (NHT) using the NTI, to obtain a first node forwarding information (NFI) and a second NFI; and
- multicast the data packet to a first load balancing node (LBN) using the first NFI and a second LBN using the second NFI.

* * * * *